United States Patent
Idicula et al.

(10) Patent No.: US 11,256,698 B2
(45) Date of Patent: Feb. 22, 2022

(54) AUTOMATED PROVISIONING FOR DATABASE PERFORMANCE

(71) Applicant: Oracle International Corporation, Redwood Shores, CA (US)

(72) Inventors: Sam Idicula, Santa Clara, CA (US); Tomas Karnagel, Zurich (CH); Jian Wen, Hollis, NH (US); Seema Sundara, Nashua, NH (US); Nipun Agarwal, Saratoga, CA (US); Mayur Bency, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 83 days.

(21) Appl. No.: 16/382,085

(22) Filed: Apr. 11, 2019

(65) Prior Publication Data

US 2020/0125568 A1    Apr. 23, 2020

Related U.S. Application Data

(60) Provisional application No. 62/747,570, filed on Oct. 18, 2018.

(51) Int. Cl.
G06F 16/2453    (2019.01)
G06F 16/21    (2019.01)
(Continued)

(52) U.S. Cl.
CPC ...... *G06F 16/24545* (2019.01); *G06F 16/217* (2019.01); *G06N 20/00* (2019.01); *G06N 20/20* (2019.01)

(58) Field of Classification Search
CPC . G06F 16/24545; G06F 16/217; G06N 20/20; G06N 20/00; G06N 2/0445
See application file for complete search history.

(56) References Cited

U.S. PATENT DOCUMENTS 6,789,069 B1    9/2004    Barnhill
10,489,215 B1    11/2019    Wen
(Continued)

FOREIGN PATENT DOCUMENTS

EP    2 128 798 A1    12/2009
EP    3 101 599 A2    12/2016
WO    WO 2008/133509 A1    11/2008

OTHER PUBLICATIONS

Singh et al., "Literature Review on Feature Selection Methods for High-Dimensional Data", International Journal of Computer Applications, vol. 136, No. 1, dated Feb. 2016, 9 pages.
(Continued)

*Primary Examiner* — Dangelino N Gortayo
(74) *Attorney, Agent, or Firm* — Hickman Becker Bingham Ledesma LLP

(57) ABSTRACT

Embodiments utilize trained query performance machine learning (QP-ML) models to predict an optimal compute node cluster size for a given in-memory workload. The QP-ML models include models that predict query task runtimes at various compute node cardinalities, and models that predict network communication time between nodes of the cluster. Embodiments also utilize an analytical model to predict overlap between predicted task runtimes and predicted network communication times. Based on this data, an optimal cluster size is selected for the workload. Embodiments further utilize trained data capacity machine learning (DC-ML) models to predict a minimum number of compute nodes needed to run a workload. The DC-ML models include models that predict the size of the workload dataset in a target data encoding, models that predict the amount of memory needed to run the queries in the workload, and models that predict the memory needed to accommodate changes to the dataset.

22 Claims, 11 Drawing Sheets

(51) Int. Cl.
 *G06N 20/00* (2019.01)
 *G06N 20/20* (2019.01)

(56) References Cited

U.S. PATENT DOCUMENTS

| | | | |
|---|---|---|---|
| 10,554,738 B1 | 2/2020 | Ren | |
| 10,606,649 B2 | 3/2020 | Baggerman | |
| 10,936,589 B1* | 3/2021 | Beitchman | G06F 16/2471 |
| 2010/0153956 A1 | 6/2010 | Capps, Jr | |
| 2014/0114952 A1* | 4/2014 | Robinson | G06F 16/24532 |
| | | | 707/718 |
| 2014/0344193 A1 | 11/2014 | Bilenko et al. | |
| 2016/0004621 A1 | 1/2016 | Gongloor | |
| 2017/0017686 A1* | 1/2017 | Feng | G06F 16/24545 |
| 2017/0068675 A1 | 3/2017 | Hazel | |
| 2018/0107711 A1 | 4/2018 | Tariq | |
| 2018/0357541 A1 | 12/2018 | Chen et al. | |
| 2019/0095756 A1 | 3/2019 | Agrawal | |
| 2019/0095785 A1 | 3/2019 | Sarkar et al. | |
| 2019/0095818 A1 | 3/2019 | Varadarajan | |
| 2019/0303475 A1* | 10/2019 | Jindal | G06N 3/08 |
| 2019/0340095 A1 | 11/2019 | Faibish | |
| 2020/0034197 A1 | 1/2020 | Nagpal | |
| 2020/0034467 A1* | 1/2020 | Kolchinsky | G06F 16/2246 |
| 2020/0073986 A1* | 3/2020 | Purcell | G06F 16/2433 |
| 2020/0104397 A1* | 4/2020 | Fan | G06F 9/52 |
| 2020/0118036 A1 | 4/2020 | Karnagel | |
| 2020/0125545 A1 | 4/2020 | Idicula | |
| 2020/0327357 A1 | 10/2020 | Karnagel | |

OTHER PUBLICATIONS

Parmezan et al., "Metalearning for Choosing Feature Selection Algorithms in Data Mining: Proposal of a New Framework", Preprint submitted to Expert Systems with Applications, Nov. 4, 2016, 66 pgs.
Microsodt Docs, "Feature Selection in the Team Data Science Process", dated Nov. 20, 2017, 5 pages.
Li et al., "Feature Selection: A Data Perspective", AMC, Computer Suru 9, Article 39, dated Mar. 2010, 45 pages.
Krupka et al., "Learning to Select Features using their Properties", Journal of Machine Learning Research 9, dated 2008, 28 pages.
Idicula, U.S. Appl. No. 16/298,837, filed Mar. 11, 2019, Office Action, dated Sep. 3, 2020.
Idicula, U.S. Appl. No. 16/298,837, filed Mar. 11, 2019, Notice of Allowance, dated Feb. 18, 2021.
Duggan, et al., 'Performance Prediction for Concurrent Database Workloads', p. 337-348, SIGMOD'11, Jun. 12-16, 2011, Athens, Greece, 12pgs.
Caruana et al., "Ensemble Selection From Libraries of Models", Proceedings, Twenty-First International Conference on Machine Learning: dated Jul. 2004, 8 pages.
Ganapathi, A. et al. "Predicting multiple performance metrics for queries: Better decisions enabled by machine learning", ICDE 2009, 12 pages.
Feurer et al. "Efficient and Robust Automated Machine Learning", dated 2015, 9 pages.
Duggan et al., ". Modeling and Prediction of Concurrent Query Performance". SIGMOD, dated 2011.
Duan et al., "Tuning Database Configuration Parameters with iTuned", VLDB dated 2009, 12 pages.
Doan et al., "Selecting Machine Learning Algorithms using Regression Models", https://www.researchgate.net/publication/304298580, dated Nov. 2015, 8 pages.
Aldave et al., "Systematic Ensemble Learning fro Regression" dated Mar. 28, 2014, pp. 1-38.
Chen Chi-Ou et al., "Machine Learning-Based Configuration Parameter Tuning on Hadoop System", dated Jun. 27, 2015, IEEE, pp. 386-392.

J.D Wichard, "Model Selection in an Ensemble Framework", The 2013 International Joint Conference on Neural Networks, dated Jan. 1, 2006, pp. 2187-2192.
Bergstra et al., "Random Search for Hyper-Parameter Optimization", Journal of Machine Learning Research 13 (2012) 281-305, dated Feb. 2012, 25 pages.
Bergstra et al., "Making a Science of Model Search: Hyperparameter Optimization in Hundreds of Dimensions for Vision Architectures", JMLR: W &CP, vol. 28, dated 2013, 9 pages.
Bergstra et al., "Hyperparameter Optimization and Boosting for Classifying Facial Expressions: How good can a "Null" Model be?", ICML Workshop on Representation and Learning, dated 2013, 7 pages.
Bergstra et al., "Hyperopt: A Python Library for Optimizing the Hyperparameters of Machine Learning Algorithms", Proc. of the 12th Python in Science Conf. (SCIPY 2013), dated 2013, 8 pages.
B. Debnath et al., SARD: A statistical approach for ranking database tuning parameters. In ICDEW, pp. 11-18, dated 2008.
Andrychowicz et al., "Learning to learn by gradient descent by gradient descent", 30th Conference on Neural Information Processing Systems dated (NIPS 2016), Barcelona, Spain, 9 pages.
Doan et al., "Algorithm Selection Using Performance and Run Time Behavior", Chapter, Artificial Intelligence: Methodology, Systems and Applicationsm AIMSA dated Sep. 2016, pp. 3-13.
Pedregosa, Fabian, "Hyperparameter Optimization with Approximate Gradient", Proceedings of the 33rd International Conference on Machinelearning, New York, vol. 48, dated Jun. 26, 2016, pp. 1-15.
Weinberger et al., "Unsupervised learning of image manifolds by semidefinite programming", IEEE, dated Jun. 27, 2004, 10 pages.
Van Aken et al., "Automatic Database Management System Tuning Through Large-scale Machine Learning," Proceedings of the 2017 ACM International Conference on Management of Data, 2017, pp. 1009-1024.
Sullivan et al., "Using probabilistic reasoning to automate software tuning", In SIGMETRICS, dated 2004, 13 pages.
Snoek, "Practical Bayesian Optimization of Machine Learning Algorithms", dated 2012, 9 pages.
Simpson et al, "Automatic Algorithm Selection in Computational Software Using Machine Learning", dated 2016, 10 pages.
Scikit Learn, "3.2. Tuning the hyper-parameters of an estimator", http://scikitlearn.org/stable/modules/grid_search.html, dated 2017, 6 pages.
Gonnet et al., Automatic Problem-Specific Hyperparameter Optimization and Model Selection for Supervised Machine Learning, Technical Report, dated Jan. 1, 2015, 54 pages.
Pinter, Janos, "Calibrating Artificial Neural Networks by Global Optimization", Technical Report, Özyeğin University, Istanbul Submitted for publication: Jul. 2010, 17 pages.
Gonzalez et al., "Batch Bayesian Optimization via Local Penalization", Proceedings of the 19th International Conference on Artificial Intelligence and Stats JMLR: W&CP vol. 41, dated 2016, 10 pages.
Nelder et al., "A Simplex Method for Function Minimization", The Computer Journal, vol. 7, dated Apr. 1, 1964, pp. 308-313.
Narayanan et al., "Continuous resource monitoring for self-predicting DBMS", IEEE International Symposium on Modeling, Analysis and Simulation of Computer and Telecommunication Systems, 2005, 10 pages.
Mendes-Moreira et al., "Ensemble Approaches for Regression", ACM Computing Surveys, ACM, New York, NY vol. 45, No. 1, dated Dec. 7, 2012, pp. 1-40.
Kuck et al, "Meta-learning with neural networks and landmarking for forecasting model selection an empirical evaluation of different feature sets applied to industry data", dated Jul. 24-29, 2016, 8pgs.
Jennie Duggan et al., ". Modeling and Prediction of Concurrent Query Performance". SIGMOD, dated 2011, 12 pages.
Zilio, D.C.A. "DBZ design advisor: integrated automatic physical database design" VLDB dated 2004, Proceedings of the Thirtieth international conference on Very large data bases, 11 pages.
Reif et al., "Meta-learning for evolutionary parameter optimization of classifiers, Machine Learning", dated 2012, 24 pages.

(56) References Cited

OTHER PUBLICATIONS

Zhen Hua Liu et al. "JSON Data Management in RDBMS", Emerging Technologies and Applications in Data Processing and Management, dated May 13, 2019, pp. 20-45.
Knut Anders Hatlen, "Partial Update of JSON Values", MySQL Server Blog, dated Apr. 3, 2018, 6 pages.
Bryan P et al., "JavaScript Object Notation (JSON) Patch; rfc6902.txt". Javascript Object Notation (JSON) Patch, Internet Engineering Task Force, Standard, Internet Society, Apr. 3, 2013, 18 pages.
Zhu et al., "To prune, or not to prune: exploring the efficacy of pruning for model compression", dated 2017, 11 pages.
Stamoulis et al., "HyperPower: Power- and Memory-Constrained Hyper-Parameter Optimization for Neural Networks", dated 2018, 7 pages.
Sprechmann et al., "Memory-Based Parameter Adaptation", Published as a conference paper at ICLR dated 2018, 16 pages.
Shohoni et al., "Low-Memory Neural Network Training: A Technical Report", Stanford University, dated Apr. 25, 2019, 38 pages.
Prasad et al., "Distributed Feature Selection Using Vertical Partitioning for High Dimensional Data", ICACCI, dated Sep. 12, 2016, 8 pages.
Moran-Fernandez et al., "Centralized vs. Distributed Feature Selection Methods Based on Data Complexity Measures", Knowledge-based Systems, dated Sep. 28, 2016, 20 pages.
Li et al., "Hyperband: A Novel Bandit-Based Approach to Hyperparameter Optimization", Journal of Machine Learning Research 18 (dated 2018) pp. 1-52.
Han et al., "Deep Compression: Compressing Deep Neural Networks With Pruning, Trained Quantization and Huffman Coding", Conference Paper at ICLR dated 2016, 14 pages.
Gelbart et al., "Bayesian Optimization with Unknown Constraints", dated 2014, 10 pages.
Bolon-Canedo et al., "Distributed Feature Selection: An Application to Microarray Data Classification", Applied Soft Computing, dated Feb. 7, 2015, 16 pages.
Pudil et al., "Floating Search Methods in Feature Selection", dated Jun. 19, 1993, 9 pages.
Narendra et al., "A Branch and Bound Algotithm for Feature Subset Selection", IEEE Transactions on Computers, vol. C-26, No. 9, dated Dec. 1977, 6 pages.
Molina et al., "Feature Selection Algorithms: A Survey and Experimental Evaluation", dated 2002, 19 pages.
Microsoft Docs, "Feature Selection Modules", dated May 5, 2019, 7 pages.
Kohavi, Ron, "Wrappers for Performance Enhancement and Oblivious Decision Graphs", dated Sep. 1995, 304 pages.
Hutter et al., "Automatic Machine Learning: Methods, Systems, Challenges", dated Oct. 16, 2018, 250 pages.
Guyon et al., "An Introduction to Variable and Feature Selection", Journal of Machine Learning Research 3 dated 2003, 26 pages.
Chandrashekar et al., "A survey on feature selection methods", Computers and Electrical Engineering 40 dated 2014, 13 pages.
Brown et al., "Conditional Likelihood Maximisation: A Unifying Framework for Information Theoretic Feature Selection", Journal of Machine Learning Research 13 (2012), 40 pages.
Albon, Chris, "ANOVA F-Value for Feature Selection", dated Dec. 20, 2017, 2 pages.
Varadarajan, U.S. Appl. No. 15/885,515, filed Jan. 31, 2018, Office Action, dated Jun. 17, 2021.
Varadarajan, U.S. Appl. No. 15/885,515, filed Jan. 31, 2018, Notice of Allowance, dated Jul. 26, 2021.
Varadarajan, U.S. Appl. No. 15/885,515, filed Jan. 31, 2018, Notice of Allowance, dated Aug. 4, 2021.
Hsu et. al., "A Practical Guide to Support Vector Classification", May 19, 2016, National Taiwan University, 2016, pp. 1-16.
Brochu et. al., "A Tutorial on Bayesian Optimization of Expensive Cost Functions, with Application to Active User Modeling and Hierarchical Reinforcement Learning", Dec. 14, 2010, pp. 1-49.
Amasyali et al., "A Study of Meta Learning For Regression", http://docs.lib.purdue.edu/ecetr, dated Jul. 1, 2009, 26 pages.
Karnagel, U.S. Appl. No. 16/417,145, filed May 20, 2019, Non-Final Rejection dated Dec. 24, 2021.
Duggan, et al., 'Performance Prediction for Concurrent Database Workloads', pp. 337-348, SIGMOD'11, Jun. 12-16, 2011, Athens, Greece, 12pgs.

* cited by examiner

202 — RECEIVE WORKLOAD INFORMATION FOR A PARTICULAR DATABASE WORKLOAD, WHEREIN THE WORKLOAD INFORMATION INCLUDES AT LEAST (A) A PORTION OF A DATASET FOR THE PARTICULAR DATABASE WORKLOAD AND (B) ONE OR MORE QUERIES BEING RUN IN THE PARTICULAR DATABASE WORKLOAD

204 — FOR EACH QUERY OF THE ONE OR MORE QUERIES, PREDICT, BASED ON THE WORKLOAD INFORMATION AND USING ONE OR MORE TRAINED QUERY PERFORMANCE MACHINE LEARNING MODELS, A PLURALITY OF PREDICTED QUERY RUNTIMES RESPECTIVELY CORRESPONDING TO A PLURALITY OF DIFFERENT COMPUTE NODECARDINALITIES

206 — BASED ON THE PLURALITY OF PREDICTED QUERY RUNTIMES IDENTIFIED FOR EACH QUERY, OF THE ONE OR MORE QUERIES, DETERMINE AN OPTIMAL NUMBER OF COMPUTE NODES FOR THE PARTICULAR DATABASE WORKLOAD

208 — GENERATE, WITHIN A MEMORY, OUTPUT THAT SPECIFIES THE OPTIMAL NUMBER OF COMPUTE NODES FOR THE PARTICULAR DATABASE WORKLOAD

FIG. 6A

| | 1 | 2 | 3 | 4 | 5 | 6 | 7 | 8 |
|---|---|---|---|---|---|---|---|---|
| QUERY 1 | 2400 | 1200 | 600 | 300 | 100 | 50 | 30 | 20 |
| QUERY 2 | 2400 | 1200 | 600 | 150 | 175 | 250 | 300 | 350 |
| QUERY 3 | 2400 | 1200 | 400 | 150 | 200 | 275 | 300 | 400 |
| QUERY 4 | 150 | 300 | 600 | 700 | 800 | 900 | 930 | 1100 |
| TOTAL RUNTIME | 7350 | 3900 | 2200 | 1300 | 1275 | 1475 | 1560 | 1870 |
| RELATIVE SPEED | 1 | 1.88 | 3.34 | 5.65 | 5.76 | 4.98 | 4.71 | 3.93 |
| CLUSTER COST | $100 | $150 | $200 | $250 | $300 | $350 | $400 | $450 |
| COST/SPEED | $100.00 | $79.59 | $59.86 | $44.22 | $52.04 | $70.24 | $84.90 | $114.49 |

FIG. 6B

| | 1 | 2 | 3 | 4 | 5 | 6 | 7 | 8 |
|---|---|---|---|---|---|---|---|---|
| (10) QUERY 1 | 2400 | 1200 | 600 | 300 | 100 | 50 | 30 | 20 |
| (2) QUERY 2 | 2400 | 1200 | 600 | 150 | 175 | 250 | 300 | 350 |
| (2) QUERY 3 | 2400 | 1200 | 400 | 150 | 200 | 275 | 300 | 400 |
| (1) QUERY 4 | 150 | 300 | 600 | 700 | 800 | 900 | 930 | 1100 |
| TOTAL WEIGHTED RUNTIME | 33750 | 17100 | 8600 | 4300 | 2550 | 2450 | 2430 | 2800 |
| WEIGHTED RELATIVE SPEED | 1 | 1.97 | 3.92 | 7.85 | 13.24 | 13.78 | 13.89 | 12.05 |
| CLUSTER COST | $100 | $150 | $200 | $250 | $300 | $350 | $400 | $450 |
| COST/ WEIGHTED SPEED | $100.00 | $76.00 | $50.96 | $31.85 | $22.67 | $25.41 | $28.80 | $37.33 |

702
RECEIVE WORKLOAD INFORMATION FOR A PARTICULAR DATABASE WORKLOAD, WHEREIN THE WORKLOAD INFORMATION INCLUDES AT LEAST (A) A PORTION OF A DATASET FOR THE PARTICULAR DATABASE WORKLOAD AND (B) ONE OR MORE QUERIES BEING RUN IN THE PARTICULAR DATABASE WORKLOAD

704
PREDICT, BASED ON THE WORKLOAD INFORMATION AND USING ONE OR MORE TRAINED DATA CAPACITY MACHINE LEARNING MODELS, A PREDICTED VOLATILE MEMORY CAPACITY REQUIRED BY THE PARTICULAR DATABASE WORKLOAD

706
DETERMINE A MINIMUM NUMBER OF COMPUTE NODES, FOR THE PARTICULAR DATABASE WORKLOAD, HAVING THE PREDICTED VOLATILE MEMORY CAPACITY

708
GENERATE, WITHIN A MEMORY, OUTPUT THAT SPECIFIES THE MINIMUM NUMBER OF COMPUTE NODES FOR THE PARTICULAR DATABASE WORKLOAD

AUTOMATED PROVISIONING FOR DATABASE PERFORMANCE

BENEFIT CLAIM; RELATED APPLICATIONS

This application claims the benefit of Provisional Appln. 62/747,570, filed Oct. 18, 2018, the entire contents of which is hereby incorporated by reference as if fully set forth herein, under 35 U.S.C. § 119(e).

Furthermore, this application is related to the following applications, the entire contents of each of which is hereby incorporated by reference as if fully set forth herein:

U.S. patent application Ser. No. 16/298,837, titled "Automated Configuration Parameter Tuning for Database Performance", filed Mar. 11, 2019;

Provisional U.S. Patent Application No. 62/745,587, titled "Automatic Feature Subset Selection Using Feature Ranking and Scalable Automatic Search" (referred to herein as the "AutoFS Application"), filed Oct. 15, 2018;

U.S. patent application Ser. No. 15/884,163, titled "Algorithm-Specific Neural Network Architectures for Automatic Machine Learning Model Selection" (referred to herein as the "AutoML Application"), filed Jan. 30, 2018; and U.S. patent application Ser. No. 15/885,515, titled "Gradient-Based Auto-Tuning for Machine Learning and Deep Learning Models" (referred to herein as the "MLAutoTune Application"), filed Jan. 31, 2018.

FIELD OF THE INVENTION

The present invention relates to database system provisioning and, more specifically, to automatically provisioning resources for a multi-node database system to run a given workload, the analysis for which predicts the space requirements of the workload and/or runtime of the workload.

BACKGROUND

One way of improving the performance of a database system is a scale-out approach, in which a previously single-node system is converted to a multi-node system that is run on a cluster of computing nodes (such as the Oracle RAPID system based on the MySQL analytic cloud service). Scaling-out is mainly used for analytical workloads, but may be used on any kind of workload that is able to be distributed to multiple machines.

Given that database systems are large software products with many optimization considerations, getting efficient performance from a database system requires proper setup, including provisioning a number of compute nodes for the system that is appropriate to handle the database system workload. Nevertheless, database users often find that it is difficult to provision resources for a database system that allow the system to meet performance goals, which are usually encoded in a service-level agreement (SLA), without over-provisioning the system. Specifically, under-provisioned database systems either perform more slowly than is required to meet the needs of the user, or cannot function at all. Also, over-provisioned database systems are more expensive than what is needed for the system to meet performance requirements. Further, some database workloads do not run faster when given more resources. Specifically, provisioning additional computing devices for a workload increases the need for communication between the devices, which can increase the cost of some kinds of database operations.

Furthermore, users that utilize cloud infrastructure to deploy their database systems can find it difficult to control provisioning in order to meet performance goals without over-provisioning. Specifically, cloud-based deployments of database systems are generally delivered as preinstalled and pre-configured services. In such cases, the user relies on the expertise of the cloud service provider to properly provision resources for the database system. However, cloud service providers generally manage database systems for many users, and it can be difficult for these providers to properly provision each system to suit each user's specific workload and performance requirements.

A cloud service provider may use a formula or analytical model to automatically determine an amount of resources to provision for a given database. However, as discussed herein, such provisioning is error-prone, and may underestimate the needed resources up to 11% in worst case scenarios. Alternatively, cloud service providers may hand-tailor the provisioning of each user workload, but this process is expensive and, given that hand-tailored provisioning requires a high level of experience and expertise in the requirements of a variety of different kinds of workloads, is also prone to error.

While there have been various attempts to predict workload performance, including those discussed above, these attempts fall short of the modern-day SLA-driven database system requirements for two reasons. The first is that the modeling is generally done at an aggregate level (either workload or query level), and does not provide accurate predictions of workload requirements given the potentially unlimited variety of workload and query types that are possible. Secondly, such attempts have been limited to single-machine configurations, and, as such, have not been connected to database cluster configurations both in terms of scalability of execution on different cluster sizes as well as in terms of the memory/resource requirements per node in a cluster.

Thus, it would be beneficial to provide an adaptive method for provisioning a database system for a given workload, the analysis for which accurately predicts the needs of the workload and allows for provisioning resources accordingly.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 2 depicts a flowchart for automatically predicting an optimal number of compute nodes for a cluster to run a given workload.

FIGS. 6A-B depict runtime prediction charts, weighted and unweighted, for a given workload.

FIG. 7 depicts a flowchart for automatically predicting a minimum number of nodes on which a given workload could be run.

DETAILED DESCRIPTION

Figure 1:
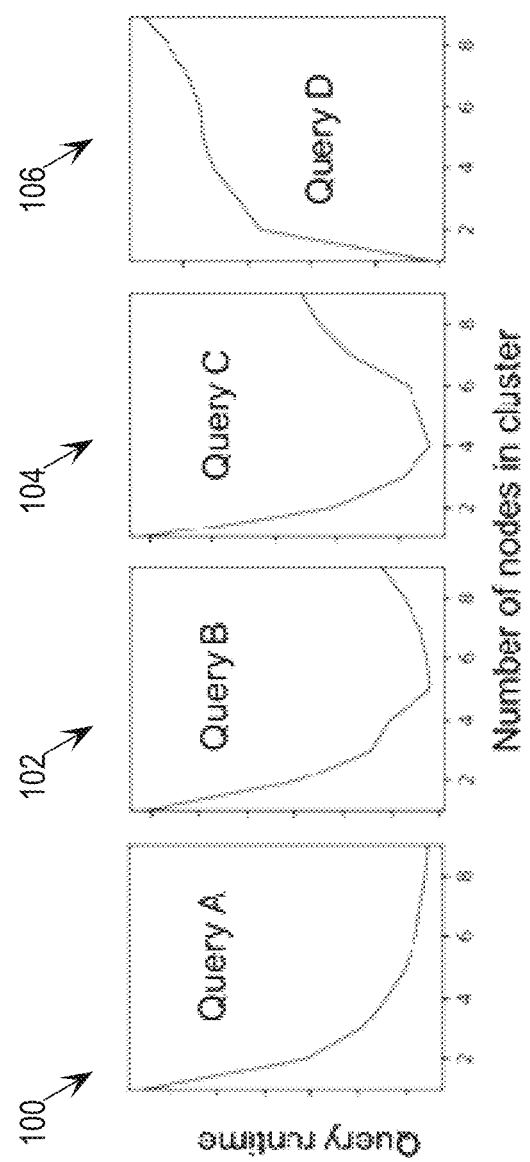
FIG. 1 depicts graphs of query runtimes, for four different types of queries, plotted against numbers of compute nodes for clusters running the respective queries.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

An in-memory workload runs much more quickly than a workload that involves persistent storage, but is much more expensive to provision. Embodiments use machine learning (ML) to automatically determine provisioning of a compute node cluster, for a given database workload to be stored as an in-memory workload, without over-provisioning the workload. Specifically, embodiments identify, for a given in-memory workload, one or both of a minimum number of compute nodes and an optimal number of compute nodes to execute the workload. Because the workload is to be an in-memory workload, any size of compute node cluster provisioned for the workload should be able to hold the dataset, and any data required by the workload queries, in its collective main memory.

Embodiments implement a machine learning prediction-driven, rather than a trial-driven or strictly rules-based, approach to automate database provisioning. Machine learning-based provisioning produces more correct results than analytical model-based provisioning, where experimental data shows that the mean square error (MSE) of the machine learning-based automatic provisioning is an order of magnitude better than analytical model-based automatic provisioning.

By using machine learning to automatically provision an in-memory workload, without over-provisioning the workload, the workload is optimally run with as few computing resources as possible given the goals of the user (i.e., cost reduction, optimized computation speed, or cost-effectiveness, which achieves a balance of the previous two goals). Based on machine learning techniques, embodiments automatically provision a workload based on execution of the workload over a relatively small sample of the workload dataset. Thus, experiments required for automatic provisioning are inexpensive and are executed very quickly and without intensive computation requirements.

Embodiments utilize trained query performance machine learning (QP-ML) models to predict an optimal compute node cluster size for a given in-memory workload. The trained QP-ML models include task-specific runtime machine learning (TSR-ML) models that facilitate prediction of the runtimes of queries based on highly-accurate individual task runtime predictions at various compute node cardinalities. The trained QP-ML models further include network communication machine learning (NC-ML) models that predict network communication time required by query tasks at the various compute node cardinalities. Again, predicting network communication time at the task level (rather than the more coarse query or workload level) results in highly accurate predictions. Furthermore, embodiments utilize an analytical model to predict any overlap between predicted task-specific runtimes and predicted network communication times. Using the results of these models, embodiments produce highly-accurate query runtimes at the various cardinalities of compute node clusters. Based on this data, an optimal compute node cluster cardinality is selected for the in-memory workload.

Embodiments further utilize trained data capacity machine learning (DC-ML) models to predict a minimum number of compute nodes needed to run a given in-memory workload. The trained DC-ML models include data encoding machine learning (DE-ML) models that predict the size of the workload dataset when translated to a target data encoding, which is generally different from the original data encoding of the dataset. The trained DC-ML models further include workload space machine learning (WS-ML) models that predict the amount of volatile memory needed to run the queries in the workload. Furthermore, the trained DC-ML models include data change rate machine learning (DCR-ML) models that predict the data capacity needed to accommodate any change to the workload dataset during workload execution.

Identifying an Optimal Compute Node Cardinality for a Given Workload

According to an embodiment, machine learning is used to predict an optimal number of compute nodes on which to run a given workload. The optimal number of compute nodes for a given workload may be based on speed, or cost-effectiveness. According to an embodiment, the basis for determining an optimal number of compute nodes for a given workload is identified by a user.

As mentioned above, not all queries increase in speed as the cluster size on which the query is implemented increases, despite the increased total processing power of the larger cluster sizes. For example, as depicted in FIG. 1, some queries get faster with more nodes (see query A 100), some get slower with more nodes (e.g., because of network overheads, see query D 106), and some get faster up to a certain point and then start to slow down as more nodes are added (see query B 102, and query C 104). This typical query behavior can depend on a number of factors, including query attributes, and the size of the dataset over which the query runs. Assuming an adequate training corpus over which to train machine learning models, which includes data from various kinds of queries, machine learning is well-suited to predict such irregular runtime results. Thus, embodiments use trained query performance machine learning models to predict the optimal number of compute nodes for a given workload.

FIG. 2 depicts a flowchart 200 for automatically predicting an optimal number of compute nodes for a cluster to run a given workload. Specifically, at step 202 of flowchart 200, workload information for a particular database workload is received, where the workload information includes at least (a) a portion of a dataset for the particular database workload and (b) one or more queries being run in the particular database workload. For example, a machine learning service, such as ML service 350 depicted in FIG. 3, receives a request, from a user, to automatically provision a particular workload.

Figure 3:
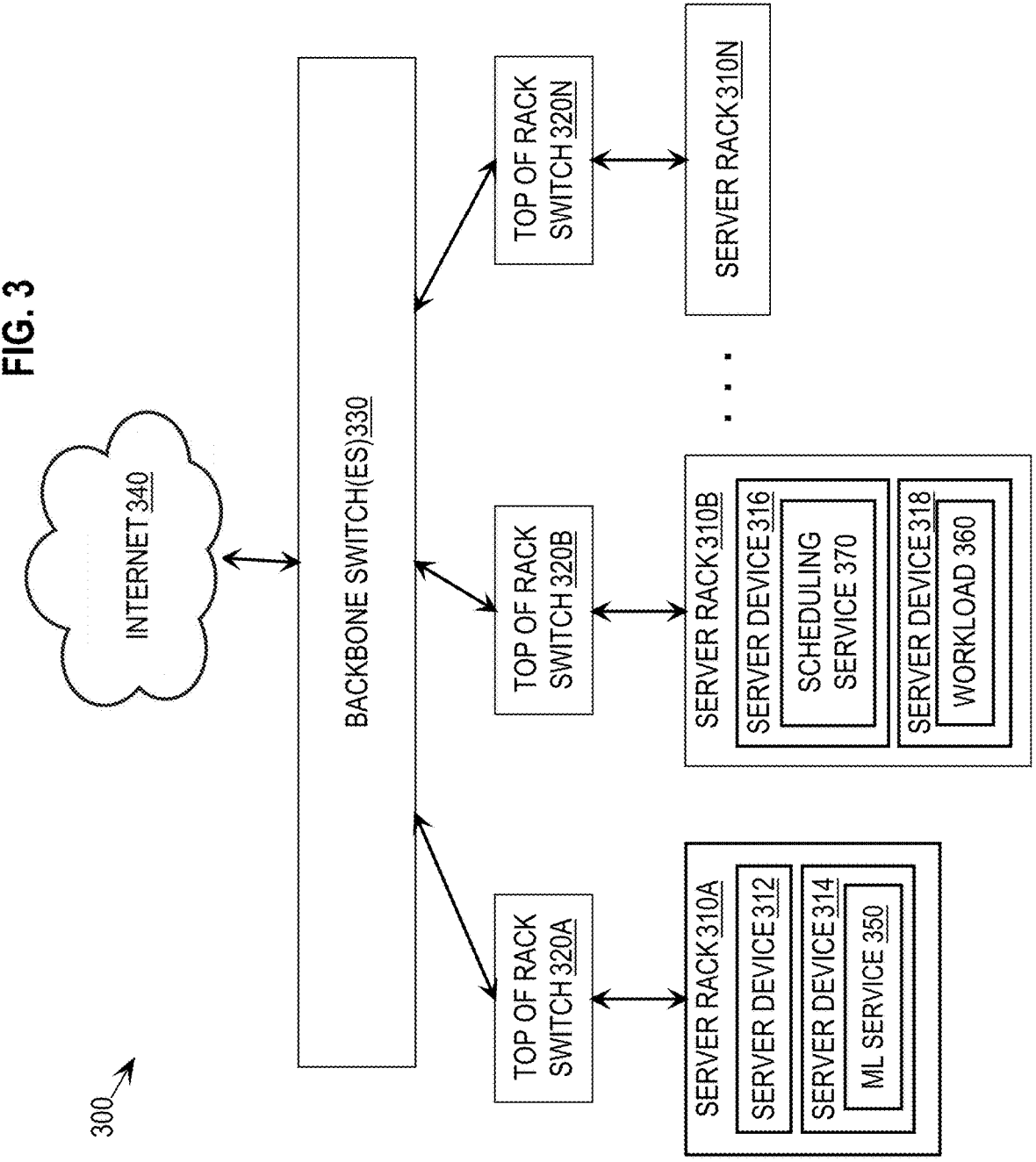
FIG. 3 depicts an example network of computing devices on which embodiments may be implemented.

FIG. 3 depicts an example network 300 of computing devices on which embodiments may be implemented. Network 300 includes server racks 310A-N (representing an arbitrary number of server racks in network 300), each of which hosts one or more server computing devices. Embodiments are described herein as being implemented by an ML service 350 running on a server device 314 of network 300. However, any number of applications running on any configuration of hardware devices may implement features described herein.

In FIG. 3, a workload 360 is depicted on server device 318. According to embodiments, this depiction of workload 360 indicates one of the following, depending on the context in which the example workload 360 is described herein:

- A sample of workload 360 is being run on server device 318.
- The full workload 360 is being run on a cluster of nodes that comprises server device 318.
- Data for workload 360 is stored in persistent storage that is accessible via server device 318.

To illustrate step 202 of flowchart 200, ML service 350 receives a request, from a user, to automatically provision workload 360, data for which is stored on persistent storage that is accessible via server device 318. In this example, workload 360 is an unknown workload, which has not yet been run on any server device of network 300. The workload information for workload 360 includes the full dataset for the workload and all queries for the workload.

According to an embodiment, ML service 350 receives information for workload 360, where the workload is a known workload that has run on the associated server device or cluster of server devices in network 300 for a length of time, based on ML service 350 (or another service) determining that one or more performance metrics associated with workload 360 do not meet one or more performance requirements for workload 360. These performance requirements may be indicated in an SLA for the workload. For example, ML service 350 automatically determines to provision workload 360 in response to determining that the total workload runtime for workload 360 is longer than a target workload runtime in an SLA for the workload.

Predicting Query Performance for Optimal Compute Node Cardinality Determination

At step 204 of flowchart 200, for each query of the one or more queries, a plurality of predicted query runtimes respectively corresponding to a plurality of different compute node cardinalities are predicted based on the workload information and using one or more trained query performance machine learning models. For example, in response to receiving the request to automatically provision workload 360, ML service 350 automatically uses one or more trained query performance machine learning models to predict the runtimes of queries in workload 360 at various compute node cardinalities. These predicted query runtimes are used, by ML service 350, to identify an optimal compute node cardinality for workload 360.

The compute node cardinalities that are tested by ML service 350 include a range of compute node cluster sizes that are available to the user that requested automatic provisioning. For example, the user has expressed interest in a level of service, in network 300, that provides for compute node clusters with 1-8 nodes. Thus, the compute node cardinalities tested by ML service 350, in connection with determining query runtimes, are cardinalities 1-8.

Extracting Features of a Workload

Training of and inference over the ML models described herein are based on observable and/or engineered features of the workload. Any of the ML models described herein may be trained on any kind of workload features, including any workload features that are mentioned herein in connection with the various types of ML models.

Thus, in response to receiving the request to automatically provision workload 360, ML service 350 automatically extracts features, from workload 360, that are used for inference over the machine learning models as described in detail herein. Some workload features may be derived from the received information for workload 360. Other features are determined based on sample runs that comprise running the workload queries over one or more samples of the workload dataset.

Accordingly, ML service 350 runs the queries in the workload 360 on a sample of the dataset of the workload and records information about the sample runs. Specifically, ML service 350 performs an initial sample run of workload 360 by causing the one or more queries of workload 360 to be run over an initial sample of the dataset using one or more small computing clusters. For example, ML service 350 causes the one or more queries of workload 360 to be run over an initial sample of the dataset (a) using a single compute node, and also (b) using a cluster of four compute nodes. ML service 350 gathers information from each cluster used for sample runs of the workload. According to an embodiment, to generate a dataset sample, ML service 350 automatically extracts a particular percentage of data from every table of the dataset, thereby maintaining the proportions of the dataset tables within the sample data.

According to an embodiment, ML service 350 causes multiple sample runs to be performed using samples comprising multiple increasing percentages of the dataset. ML service 350 performs inference over the QP-ML models, as described in detail below, using the data from the multiple sample runs. ML service 350 determines that the sample size is sufficient when the predictions resulting from inference over the QP-ML models using workload features derived from the different sample runs converge.

For example, ML service 150 performs sample runs using samples comprising 0.05% and 0.1% of the dataset for workload 360, respectively. ML service 350 performs inference over the QP-ML models using the features that were gathered from the two sample runs and determines if the resulting predictions converge (i.e., are within a threshold percentage of each other). If the predictions do not converge, ML service 350 performs a further sample run using a larger percentage of the dataset for workload 360, e.g., 0.15%. ML service 350 performs inference over the QP-ML models using the resulting features and determines whether these new predictions converge with the predictions resulting from the smaller sample run. ML service 350 carries on increasing the percentage of sample data from workload 360 for sample runs, and performing inference over the QP-ML models using the resulting features, until the predictions from the sample runs converge.

In this embodiment, once the predictions converge, ML service 350 utilizes the converged predictions as the final predictions for workload 360. According to an embodiment, once the predictions have converged, ML service 350 performs inference over the DC-ML models using the features from the largest sample size taken from workload 360, as needed, to determine the minimum number of compute nodes for the workload, as described in detail below.

According to an embodiment, the starting sample percentage for the sample runs, and/or the increment percentage for sampling is adjusted automatically. For example, ML service 350 determines that over a threshold amount of historical sample runs show converged query performance predictions when the sample sizes are between 0.4% and 1.0% of the datasets. In response to this determination, ML service 350 automatically changes the starting percentage for sample runs to 0.4%. Such automatic adjustment of the sample sizes speeds up convergence for most workloads.

Query Performance Machine Learning Models

As indicated in step 204 of flowchart 200, ML service 350 predicts runtimes of queries in workload 360, based on multiple compute node cardinalities, using one or more trained QP-ML models. The accuracy of a query/workload runtime prediction is affected by the granularity at which the prediction is generated. Many different levels of granularity are possible, including: (1) full workload (including all queries in the workload), (2) query (comprising one or more query tasks/operators), (3) query task (comprising one or more operators), (4) query operator, etc. Workload-level and query-level predictions are too coarse-grained to produce consistently accurate runtime predictions as there are many different kinds of workloads and queries; accurate ML models are difficult to train based on such a wide range of data. Furthermore, operator-level predictions can be cumbersome given the number of operators that are generally present in queries. Also, operator-level predictions tend to produce inaccurate query-level predictions because single operator runtimes do not always aggregate to accurate task/query runtimes due to various overheads.

As such, embodiments use a task-level approach to query runtime prediction, which results in very accurate query runtime predictions. Tasks are groups of one or more operators that are grouped together by a query optimizer, and the tasks of a given query are indicated in the query plan that the optimizer generates for the query. The query optimizer groups the operators of a query into tasks using a set of internal rules to optimize the query. Based on these rules, there are only a limited number of task types. Specifically, despite the many operator types that could potentially be grouped into tasks, the number of task types is not much higher than the number of different operators since many operators only occur alone in a task or with certain other operators according to the rules implemented by query optimizers.

Furthermore, query optimizers generally formulate tasks such that a given task is executed by a single compute node, resulting in no network communication being required to accomplish a single task. Thus, any network communication occurs outside of the task runtime, which allows network communication time to be considered separately from predicted task runtimes.

Thus, according to an embodiment, the QP-ML models comprise the following ML models that operate at a task-based granularity level: task-specific runtime machine learning (TSR-ML) models that predict runtimes of tasks in queries; and network communication machine learning (NC-ML) models that predict time required for communication between nodes. According to an embodiment, ML service 350 further uses a runtime/communication overlap analytical (RCO-A) model to predict any overlap that is likely to occur between the predicted task-specific runtimes (from the TSR-ML models) and the predicted network communication times (from the NC-ML models). Using these three models, ML service 350 predicts the runtimes of workloads on the different compute node cardinalities.

Task-Specific Runtime Machine Learning Models

According to an embodiment, ML service 350 uses one or more trained TSR-ML models to predict runtimes of the queries in workload 360. According to embodiments, the trained TSR-ML models are trained on, and inference is performed over them, based on one or more of the following workload features:

Encoding type and width of each column
Number of rows in each input relation
Number of rows in output relation
Number of partitions in each input relation
Number of partitions in output relation
Output relation type (network vs. local)
Vector-buffer size
Chunk size Each trained TSR-ML model is trained to predict the runtime of a respective task type, where the type of a query task is defined by the types and numbers of operators included in the task. For example, query optimizers group filter operators into their own tasks to create [filter] type tasks, and group join build operators and join probe operators together in tasks to create [join build, join probe] type tasks. For each type of task, ML service 350 uses task type-specific information in a training corpus (including amounts of data that go into tasks of the different types, and sizes of result sets that are results from the tasks) to train a plurality of TSR-ML models, which includes a first TSR-ML model for [filter] type tasks, and a second TSR-ML model for [join build, join probe] type tasks. By performing inference over these trained TSR-ML models using data from workloads being provisioned, ML service 350 predicts task runtimes for tasks in workload queries.

The following illustration walks through using one or more trained TSR-ML models to predict, based on the workload information for workload 360, a query runtime for a given query in workload 360 hypothetically running on a compute node cluster of a particular cardinality, e.g., 4. Such predictions would be performed for each query in the subject workload, and for each compute node cardinality being tested, e.g., 1-8.

Figure 4:
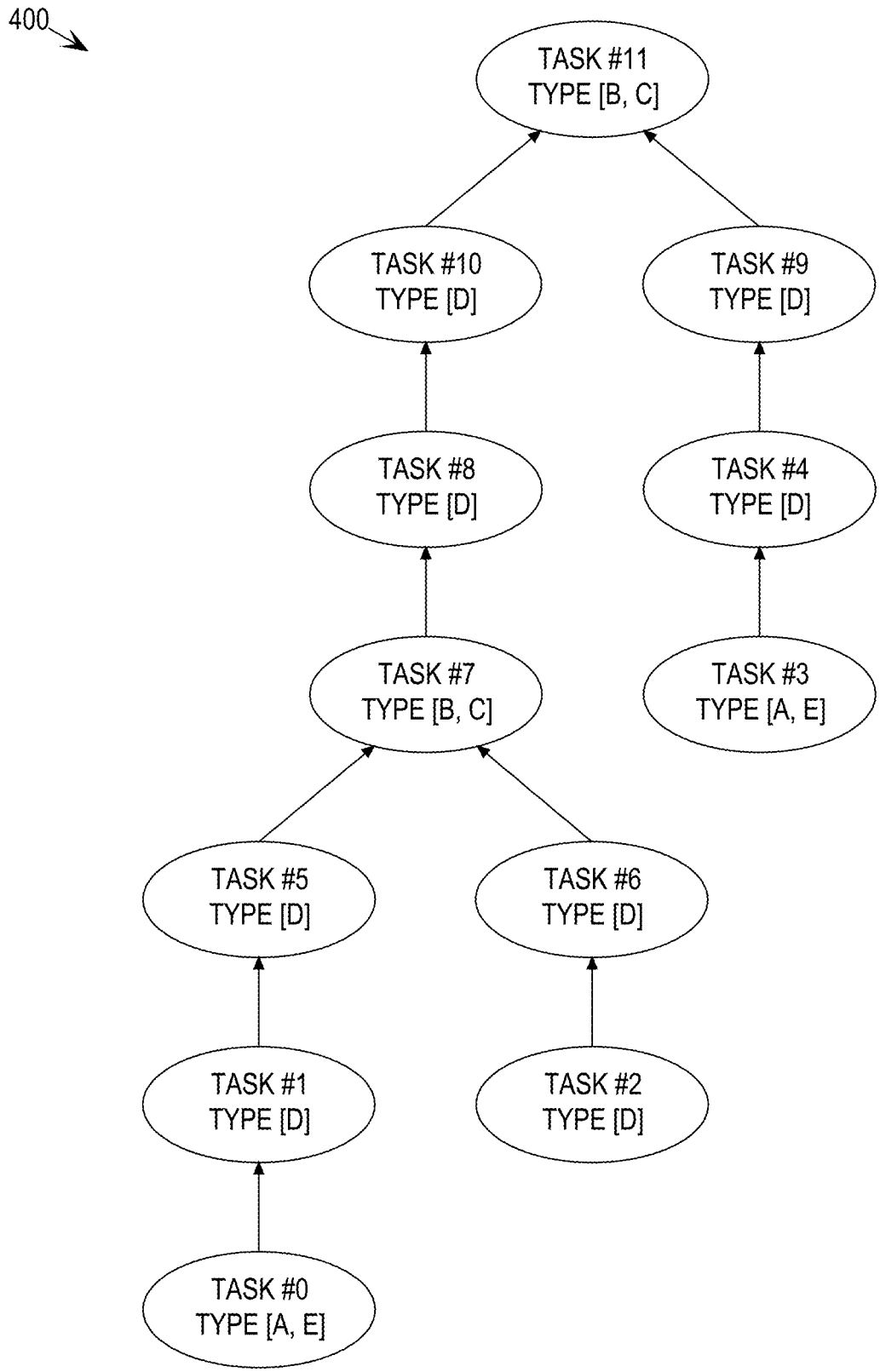
FIG. 4 depicts, in graph form, tasks mapped out in a query plan for a given query.

To illustrate, workload 360 includes a particular query 400 that is depicted, in graph form, in FIG. 4. The depiction, in FIG. 4, of query 400 is a visualization of tasks mapped out in a query plan for the query. Specifically, the query plan for example query 400 includes tasks #0-#11. The tasks are executed in an order that corresponds to the respective task numbers, and arrows between tasks illustrate dependencies among the tasks. For example, task #0 is initiated before any other task, and task #1 (which is initiated next) depends on the output from task #0, as indicated by the arrow connecting the two tasks. As shown in the graph, final task #11 depends on the results of all other tasks in the query. Furthermore, each task is associated with a task type. The task types are characterized by the operators grouped into the task, which are indicated by the letters in the square braces. Specifically, there are five example operator types in query 400 (A, B, C, D, and E), and three task types ([A, E], [D], and [B, C].

In order to analyze query 400 in workload 360, ML service 350 identifies one or more task instances in the query plan for the query. Accordingly, ML service 350 identifies the 12 task instances, i.e., tasks #0-#11, in the query plan for query 400. Based on the information for the tasks in query 400, obtained from the query plan, ML service 350 identifies TSR-ML models that are specific to the task types in the plan, and uses these models to predict runtimes for the tasks.

For each of the one or more identified task instances, ML service 350 uses a trained TSR-ML model that is specific to a task type of the respective task instance to predict a runtime for the respective task instance given the particular compute node cardinality being tested. To illustrate, ML service 350 uses a first trained TSR-ML model that is trained to predict runtimes for tasks of type [A, E] to predict the runtime of task #0 when hypothetically run by a cluster with four compute nodes. ML service 350 uses this [A, E]-trained TSR-ML model to predict the runtime of task #3 with a compute node cardinality of four as well, given that task #3 is of the same type as task #0. ML service 350 uses a [D]-trained TSR-ML model to predict the runtimes of tasks #1, #2, #4, #5, #6, #8, #9, and #10 with the compute node cardinality of four. ML service 350 further uses a [B, C]-trained TSR-ML model to predict the runtimes of tasks #7 and #11 with the compute node cardinality of four.

Network Communication Machine Learning Models

Once ML service 350 has determined all of the predicted runtimes of the tasks in query 400 at the given compute node cardinality (e.g., 4), ML service 350 uses one or more trained NC-ML models to predict the amount of inter-node network communication that would be required for query 400 given the compute node cardinality. When a workload runs on more than one node, the different nodes in the cluster exchange data, including intermediate query results, through the network. These data transfers might cause a workload task to stall until all data required for the task is received from other nodes. Thus, determination of the time required for network communication is an important factor for combining task runtimes into an accurate query runtime prediction.

Specifically, ML service 350 predicts, for each compute node cluster cardinality being tested and using the one or more trained NC-ML models, predicted network communication times for each task in each query. To illustrate, continuing with the previous example used in connection with the TSR-ML models above, ML service 350 predicts communication times for tasks in query 400, at a compute node cardinality of 4, using one or more trained NC-ML models.

According to an embodiment, the one or more trained NC-ML models include respective NC-ML models that are trained to predict communication times for particular communication patterns, such as partition-type communication or broadcast-type communication. ML service 350 may derive the type of communication being performed for tasks in a given query based on information in the pertinent query plan. ML service 350 performs inference over a given communication type-specific NC-ML model based on the amount of data transferred between nodes during sample runs of the workload.

For example, ML service 350 has trained NC-ML models regarding network communication times, over the various possible cardinalities of compute node clusters, for multiple types of communication patterns, including partition-type communication and broadcast-type communication. In order to determine the network communication times needed for communications between tasks of query 400, ML service 350 determines the communication types of each communication required by tasks in query 400 based on the query plan for the query. For example, ML service 350 determines that, at compute node cardinality 4, the following tasks require partition-type communications: (a) task #1 to task #5, (b) task #2 to task #6, and (c) task #4 to task #9. ML service 350 further determines that the following tasks require broadcast-type communications: (a) task #5 to task #7, (b) task #6 to task #7, (c) task #9 to task #11, and (d) task #10 to task #11. (Required communications between tasks of a given query may change for different compute node cardinalities.) In order to predict the amount of time required for a given communication between tasks, ML service 350 performs inference over the NC-ML model that corresponds to the type of the communication.

Analytical Model

ML service 350 employs a runtime/communication overlap analytical (RCO-A) model to combine the results of the TSR-ML models and NC-ML models. This model allows ML service 350 to take into account the potentially significant amount of time that the task runtimes overlap with network communication times, in which case the overlapped network communication time has no impact on the runtime of the query. Specifically, ML service 350 uses the RCO-A model to compute possible overlap in the predicted task runtimes and predicted network communication times based on the order that the task instances are computed in the query being analyzed, and also whether the tasks will exchange data over the network. According to an embodiment, ML service 350 determines whether task instances exchange data over the network based on task type. Specifically, some task types produce results that need to be exchanged after the task is complete, and other task types only produce local results. ML service 350 determines the final query runtime prediction based on the predicted task runtimes, the predicted network communication times, and the possible overlap between the two.

Figure 5:
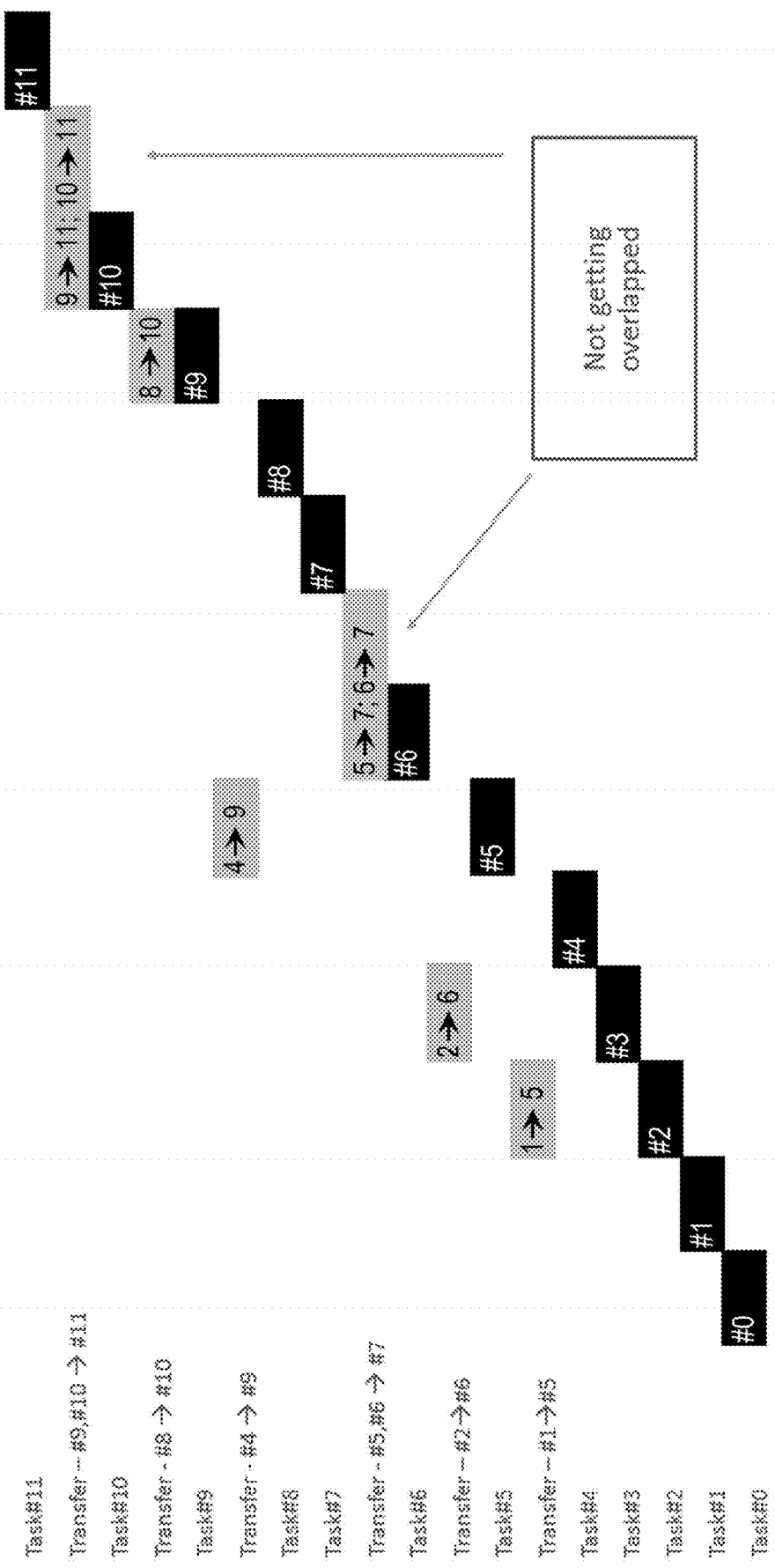
FIG. 5 depicts a runtime/network communication time overlap graph for tasks in a query.

To illustrate application of the RCO-A model, FIG. 5 depicts a runtime/network communication time overlap graph 500 for the tasks in query 400, in which tasks of type [D] require exchanging data after task completion. Each of the black bars in graph 500 represents the predicted runtime of the associated task. The gray bars represent network transfers required to complete tasks #5, #6, #7, #9, #10, and #11. In this example, the network transfers for tasks #5, #6, #9, and #10 can be fully overlapped with task runtimes, while the transfers for tasks #7 and #11 can only partially be overlapped with task computation. Thus, tasks #7 and #11 must be delayed until the respective transfers that are required for the individual tasks are complete. The order of tasks and the dependency on data exchanges from other tasks is found in the query plan for query 400.

ML service 350 determines the full predicted runtime for query 400 based on the time needed from starting the first task of the query to finishing the last task of the query, including all delays required to complete needed network transfers.

Identifying an Optimal Cluster Size Based on Speed

Returning to the discussion of flowchart 200 of FIG. 2, at step 206, based on the plurality of predicted query runtimes identified for each query, of the one or more queries, an optimal number of compute nodes for the particular database workload is determined. For example, ML service 350 utilizes the cardinality-specific predicted query runtimes generated using the QR-ML models, the NC-ML models, and RCO-A model, as described above, to identify an optimal number of compute nodes to run the full workload 360.

According to an embodiment, the optimal cluster size is based on the runtime. In other words, ML service 350 identifies the optimal cluster node cardinality to be the compute node cluster size that is predicted to run workload 360 with the shortest total runtime. For example, ML service 350 identifies a cardinality-specific query runtime for each query in workload 360 based on each possible cardinality (e.g., 1-8). ML service 350 determines the total workload runtime for each compute node cardinality based on the respective query runtimes computed for each respective cardinality. Thus, ML service 350 uses all query runtimes calculated for cardinality 4 to determine a total workload runtime for cardinality 4, etc.

According to an embodiment, ML service 350 identifies the optimal compute node cardinality to be the cardinality with the shortest total workload runtime. According to an embodiment, ML service 350 determines an unweighted total workload runtime for a particular compute node cardinality by adding the predicted query runtimes, at the cardinality, for each query in the workload with each predicted query runtime weighted equally. To illustrate, FIG. 6A depicts an unweighted runtime prediction chart 600 for workload 360, which includes Queries 1-4. The predicted runtimes for the queries at each cardinality 1-8 is depicted in rows 602-608 of chart 600. ML service determines the cardinality-specific total unweighted runtimes of the workload by adding the predicted query runtimes for each query 1-4 at each cardinality 1-8, as shown in row 610 of chart 600. Based on these cardinality-specific predicted workload runtimes, ML service 350 determines that the compute node cluster cardinality having the shortest predicted runtime is cardinality 5, having a predicted runtime of 1275 ms.

According to another embodiment, ML service 350 weights the predicted query runtimes before adding them together to generate cardinality-specific total weighted query runtimes. Weighting the predicted query runtimes generally increases the accuracy of the workload runtime predictions, especially when the queries are utilized unevenly over the course of running the workload.

FIG. 6B depicts a weighted runtime prediction chart 620 for workload 360, which includes the predicted cardinality-specific query runtimes at rows 622-628. For example, as shown in chart 620, the workload information indicates that, for every one time that Query 4 is run, Query 1 is run 10 times, Query 2 is run twice, and Query 3 is run twice. ML service 350 calculates the cardinality-specific predicted total weighted runtimes for workload 360 by multiplying each cardinality-specific predicted query runtime by its respective weight and adding the weighted query runtimes for each cardinality, as shown in row 630 of chart 620. Using this technique, ML service 350 determines that the compute node cluster cardinality having the shortest predicted weighted runtime is 7, having a predicted total weighted workload runtime of 2430 ms.

Identifying an Optimal Cluster Size Based on Cost Effectiveness

Users who want speedy performance do not always want to pay a premium for diminishing speed returns. Thus, according to an embodiment, ML service 350 determines the optimal number of compute nodes for a workload based on a balance of the cost of the cluster size and the relative speed with which the cluster is predicted to run the workload. This allows a user to provision a workload based on getting the most speed for the money spent on provisioning. Furthermore, provisioning based on cost-effectiveness conserves resources of network 300 in that processing power is not wasted on excessive network communications between nodes of a cluster.

For example, once ML service 350 has determined the cardinality-specific total predicted workload runtimes (either weighted or unweighted) for workload 360, ML service 350 compares the relative speeds associated with the different compute node cluster cardinalities in light of the associated costs of the respective clusters. To illustrate in the context of chart 600, ML service 350 determines the relative predicted speeds of each compute node cardinality 1-8 based on a ratio between (a) a maximum cardinality-specific total workload runtime of the calculated cardinality-specific workload runtimes, and (b) the cardinality-specific total workload runtime for the respective compute node cardinality.

As shown in row 612, the unweighted relative speed associated with each cardinality is calculated by dividing the longest predicted runtime of the various cardinality-specific total workload runtimes (i.e., 7350 ms, associated with compute node cardinality 1) by the various cardinality-specific total predicted workload runtimes. As expected, the cardinality with the fastest speed is also the cardinality with the shortest runtime, i.e., cardinality 5, which is 5.76 times faster than cardinality 1.

ML service 350 determines the cost-effectiveness of each compute node cardinality based on a ratio of (a) a cost of the compute node cardinality, and (b) a cardinality-specific workload speed associated with the compute node cardinality. The compute node cardinality with the minimum cost to speed ratio is the most cost-effective cardinality for the workload.

To illustrate, as shown in row 614 of chart 600, the base price of running a workload on network 300 is $100 per month, and each additional compute node adds $50 to the monthly price. Row 616 of chart 600 indicates the cardinality-specific cost-to-speed ratios for each cardinality. Compute node cardinality 4 is associated with the lowest cost-to-speed ratio, i.e., $44.22, which is the cost of that cardinality ($250) divided by the relative speed of the cardinality (5.65 times the slowest speed). Thus, cardinality 4 is determined to be the most cost-effectiveness-based optimal cardinality for workload 360.

Similarly, in the context of the weighted runtimes, ML service 350 determines the relative weighted speed of each compute node cardinality by dividing the longest predicted weighted runtime of the various cardinality-specific weighted runtimes (i.e., 33750 ms, associated with compute node cardinality 1) by the various cardinality-specific weighted total predicted workload runtimes. ML service 350 determines the weighted cost effectiveness of each compute node cardinality by dividing the cost of the cardinality (row 634 of chart 620) by the weighted speed associated with each cardinality (row 632), where the cost-to-speed ratios resulting from such calculations is shown in row 636. In this example, cardinality 5 is determined to be the most cost-effectiveness-based optimal cardinality for the workload based on cardinality 5 being associated with the lowest weighted cost-to-speed ratio, i.e., $22.67.

According to an embodiment, if multiple cardinalities are associated with the same cost-to-speed ratios, ML service 350 automatically identifies the cost-effectiveness-based optimal cardinality for the workload to be the fastest cardinality with the minimum cost-to-speed ratio.

According to an embodiment, the optimal number of compute nodes that is determined for a given workload meets the user's Service-Level-Agreement (SLA), which could be a specific target total workload runtime, or a target query response time or a specific throughput. For example, once ML service 350 predicts an optimal compute node cardinality for a particular workload, ML service 350 estimates a query response time performance metric and/or throughput performance metric (e.g., queries per second) for the workload given the predicted optimal number of nodes.

If the estimated performance metric does not satisfy a requirement in the SLA for the workload, ML service 350 automatically generates an output, within a memory, that specifies the estimated performance metric. This output may be communicated to the user, utilized for further computations, etc.

Identifying a Minimum Compute Node Cardinality for a Given Workload

According to an embodiment, a minimum number of compute nodes needed to run a given workload is determined based on a predicted amount of memory needed to store and run the workload. Information about the minimum number of compute nodes needed to run a given workload can be very useful to a user, i.e., to ensure that the user does not attempt to provision less than the minimum amount of memory needed to store and run the workload. In order to determine an amount of memory needed to store and run a given workload, embodiments use machine learning to determine one or more of: an amount of memory required to store the full dataset based on a target data encoding, an amount of memory required to store intermediate and final results of queries in the workload, and a data change rate for the workload dataset.

FIG. 7 depicts a flowchart 700 for automatically predicting a minimum number of nodes on which a given workload could be run. At step 702 of flowchart 700, workload information for a particular database workload is received, where the workload information includes at least (a) a portion of a dataset for the particular database workload and (b) one or more queries being run in the particular database workload. For example, as described above in connection with step 202 of FIG. 2, information for workload 360 is received by ML service 350.

Predicting Data Capacity for Minimum Compute Node Cardinality Determination

At step 704, based on the workload information and using one or more trained data capacity machine learning models, a predicted volatile memory capacity required by the particular database workload is predicted. For example, ML service 350 applies one or more trained data capacity machine learning models that are configured to predict aspects of workload 360, from features of the workload, that factor into the data capacity required to run the in-memory workload. According to an embodiment, the data capacity ML models include (a) data encoding ML models, (b) workload space ML models, and (c) data change rate ML models.

Further, in order to prepare for data capacity prediction, ML service 350 extracts features of workload 360 based, at least in part, on one or more of:
  Sample runs of workload 360, as described in detail above, which provides information such as Number of Distinct Values (NDV), data value ranges (min, max, avg), target encoded sample size, number of rows and/or partitions in each input relation, number of rows and/or partitions in each output relation, etc.
  Table definitions included in the information for workload 360, which provides information such as data type and size for each table column (e.g., VARCHAR(10), DECIMAL(10,2), etc.).
  Table statistics included with the information for workload 360, which includes information such as the cardinality (number of rows) of the dataset tables, and the size of the full table in the original encoding.

Based on these identified features of workload 360, ML service 350 determines any engineered features that are used by the DC-ML models, such as:
  Number of columns for each database column type (e.g., int, tinyint, smallint, mediumint, int, bigint, float, double, date, timestamp, varchar, char, decimal, etc.).
  Number of columns for each database column type multiplied by the cardinality or estimated cardinality (number of rows) of the table (e.g., number_of_int_columns*cardinality).
  Number of columns of each type and width, i.e., compute encoding type and encoded width of each column
  Column width ranges
  Total encoded size of columns of each type and width (number_of_columns*number_of_rows)

According to an embodiment, ML service 350 determines workload features, such as value width (avg, min, max), value range, number of distinct values (NDV), percentage of distinct values, variation in precision, etc., based on the received information for the workload. According to an embodiment, ML service 350 estimates one or more of the features based on information from sample runs on the workload described in further detail above.

Such engineered and estimated features may be used with any ML model described herein.

Data Encoding Machine Learning Models

The determination of the needed memory capacity for an in-memory workload dataset is complicated by the fact that the original workload dataset and the dataset stored within memory of the cluster of compute nodes are generally encoded differently. Thus, a one-to-one conversion of the data size from the encoding used for the original data (original encoding) to the encoding used in the memory of the compute node cluster (target encoding) is generally not possible.

Thus, according to an embodiment, ML service 350 uses trained data encoding machine learning (DE-ML) models to determine a size of the dataset of workload 360 when the dataset is translated from its original data encoding to a target data encoding required for storage in volatile memory, i.e., used by the database accelerator running on the compute nodes in network 300. For example, ML service 350 uses one or more of the determined or engineered features from workload 360 to perform inference over the one or more trained DE-ML models to produce a prediction of the memory capacity required to store the dataset of workload 360 in target memory. In particular, ML service 350 bases inference over the one or more trained DE-ML models on one or more of the following workload features: NDV in the dataset, data types represented in the dataset, and values that occur in the dataset.

For example, the dataset of workload 360 is encoded using an original data encoding, such as a row-based format, and, in this original encoding, is 1 TB (terabyte) in size. Based on features of workload 360, ML service 350 uses the one or more trained DE-ML models to predict the size of the entire dataset of the workload when translated to a target data encoding, such as a column-based format. To illustrate, based on features of workload 360, inference over the one or more trained DE-ML models provides a prediction that the size of the entire dataset of workload 360 will be 900 GB (gigabytes) when encoded using the target data encoding. As another example, the encodings comprise original and target encodings of individual datatypes, such as an original encoding of strings based on string length and a target encoding of strings that is a fixed length, i.e., 4 bytes because string values are represented as dictionary entry numbers.

Workload Space Machine Learning Models

Another component of determining the amount of memory that will be required to run in-memory workload

360 is determining the amount of memory required for running the queries in the workload. Specifically, each query in workload 360 may produce partitions and/or intermediate results, which would need to be stored while the query is being executed, and also produces final results that also need to be stored. Thus, the amount of memory required for running the queries in the workload must be available in-memory, together with the memory to store the dataset of the workload, in order for the workload to function properly.

Thus, according to an embodiment, ML service 350 automatically attributes a configurable percentage of the predicted dataset size to the query result memory capacity requirement of the workload. For example, ML service 350 automatically determines that the query result memory requirement of workload 360 is 90% of the predicted in-memory dataset size, i.e., 90% of 900 GB, or 810 GB (gigabytes).

According to another embodiment, ML service 350 uses one or more trained workload space machine learning (WS-ML) models to predict a size of volatile memory required to run each of the one or more queries in workload 360, including storing intermediate and final results of the one or more queries. The one or more trained WS-ML models receive, as input, one or more determined or engineered features of the workload (such as aggregate column-level features, e.g., a number of columns of each data type aggregated with the width of the respective columns). ML service 350 identifies a total workload space requirement for workload 360 based on the workload space requirement for all of the queries in the workload.

For example, ML service 350 records memory requirements of workload 360 queries during the sample runs of the workload, described in detail above. ML service 350 performs inference over the WS-ML models using the sample query memory requirement data to identify predicted full workload query memory requirements for the workload. To illustrate, ML service 350 performs inference, based on data gathered during sample runs, over the WS-ML models to estimate numbers of rows going in and out of the tasks in queries of the workload for the full dataset. ML service 350 determines the space needed for intermediate results of a given query based the estimated numbers of rows for query tasks and the size of data in the target encoding. According to an embodiment, ML service 350 determines the size of the rows based on results of the DE-ML models described above, i.e., which indicate row sizes in the target encoding.

According to an embodiment, the amount of memory estimated to be required for running the queries of a given workload is based on the assumption that queries are run serially, rather than in parallel. In this embodiment, the workload memory space required for a given workload is the largest amount of space estimated to be needed for a single query in the workload.

Data Change Rate Machine Learning Models

Cluster-based workloads generally operate in two modes: (1) snapshot mode, where the dataset is offloaded to the cluster for query processing, but changes to the data are not propagated through the in-memory dataset stored at the node cluster, and (2) change propagation mode, where data changes made by workload queries are propagated to the dataset stored at the cluster nodes.

Thus, according to an embodiment, when a workload is to be operated in change propagation mode, ML service 350 further uses one or more trained data change rate machine learning (DCR-ML) models to determine a size of volatile memory required by a workload dataset to store data changes and data growth during query processing. The one or more trained DCR-ML models model the changes in dataset size resulting from change propagation using change propagation-based features such as: a rate of changes from historical information maintained in a database log in the received workload data; a configurable parameter indicating the frequency of change application (i.e., how often changes are offloaded); predicted dataset size in the target encoding; how many old versions are stored (cached) for the workload at the target DBMS; a frequency of garbage collection on the server side; and granularity of changes (row-level vs. block-level); etc.

For example, workload 360 executes in change propagation mode and, accordingly, ML service 350 gathers change propagation-based features for workload 360. ML service 350 performs inference over the one or more trained DCR-ML models using the change propagation-based features to identify predicted data change rate memory requirements for workload 360.

Determining a Minimum Number of Nodes for a Workload Based on the Predicted Memory Requirement Returning to the discussion of flowchart 700 of FIG. 7, at step 706, a minimum number of compute nodes, for the particular database workload, having the predicted volatile memory capacity are determined. For example, based on the predicted dataset size, the predicted workload space requirement, and the predicted data change rate memory requirements, ML service 350 calculates a minimum necessary memory capacity for workload 360. Depending on the memory capacity of compute nodes, ML service 350 derives a minimum number of nodes needed for workload.

For example, using the techniques described above, ML service 350 predicts that the dataset size for workload 360 in the target data encoding is 900 GB, the workload space requirement is 810 GB, and the data change rate memory requirement is an additional 290 GB, for a total of 2 TB memory requirement. Each node in network 300 can store 500 GB in volatile memory. Thus, the minimum number of nodes to run workload 360 is four compute nodes.

Provisioning the Workload

At step 208 of flowchart 200 (FIG. 2), output that specifies the optimal number of compute nodes for the particular database workload is generated within a memory, and at step 708 of flowchart 700 (FIG. 7), output that specifies the minimum number of compute nodes for the particular database workload is generated within a memory. Continuing with previous examples, ML service 350 generates output that specifies one or both of the optimal compute node cardinality and minimum compute node cardinality for workload 360, e.g., within memory of server device 314.

The output could be stored in volatile memory and/or persistent memory, and may be used to generate reports for users, as input of other computing processing, and/or to automatically provision workload 360. For example, ML service 350 generates a communication for a user, based on the generated output, and gives the user access to the communication, e.g., in an email, in a graphical user interface such as a control panel for the workload, etc. One or both of the minimum number of compute nodes and optimal number of compute nodes may be communicated in this way.

As a further example, ML service automatically provisions workload 360 using the generated output. To illustrate, ML service 350 uses the minimum number of nodes, in the generated output, to automatically prevent less than the minimum number of nodes being provisioned for the workload. As a further example, ML service 350 automatically provisions the optimal number of compute nodes, in the generated output, and loads the workload onto the provisioned cluster of compute nodes, e.g., in response to a request from the user to automatically provision the workload using the identified optimal compute node cardinality (where this request is either communicated with an original request to identify the optimal compute node cardinality or communicated after the optimal compute node cardinality is identified).

Details of Performance Gains

Figure 8:
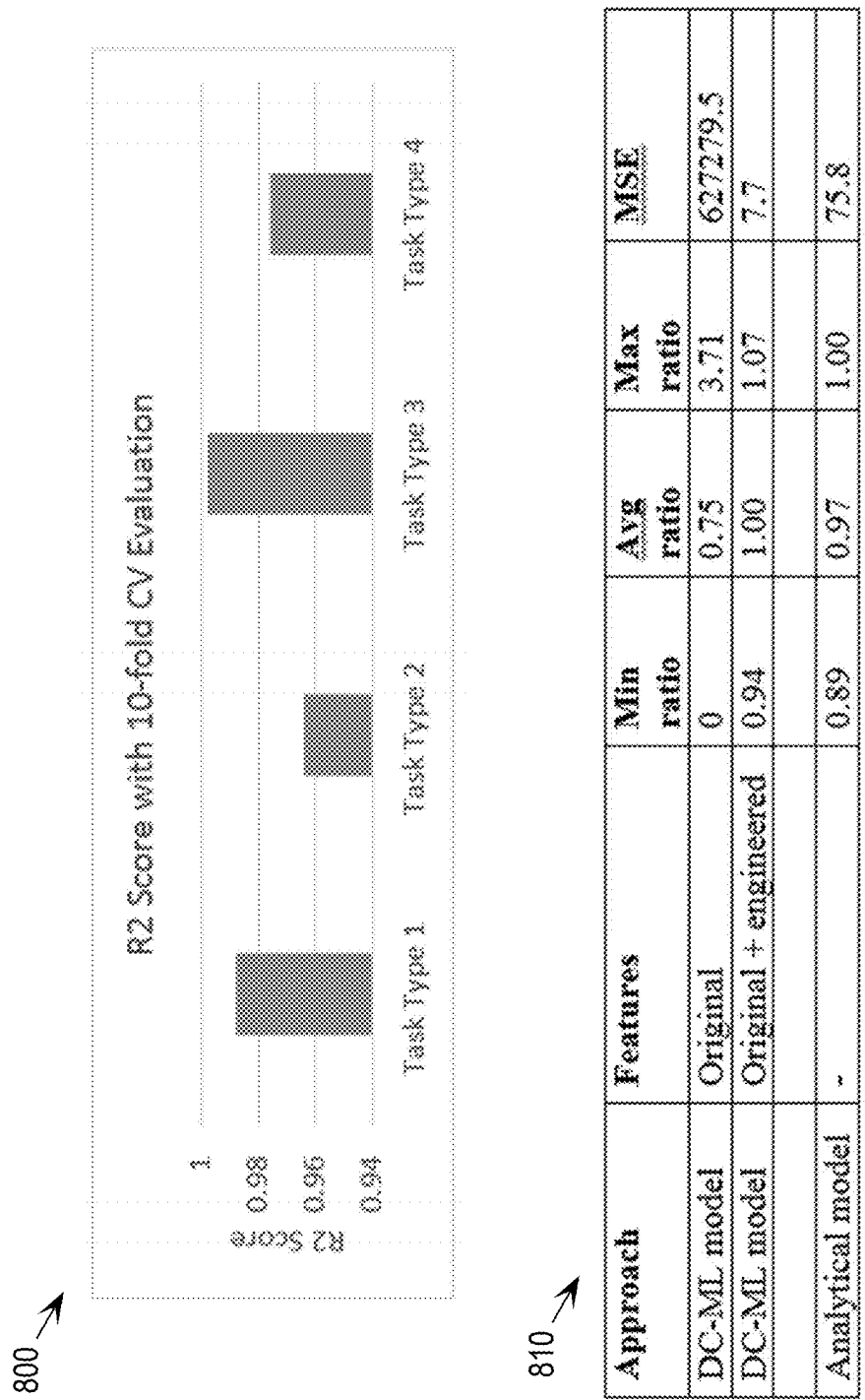
FIG. 8 depicts results of utilizing techniques described herein to predict task runtime and dataset sizes.

FIG. 8 depicts a graph 800 with results of utilizing techniques described herein to predict task runtime. Specifically, runtimes for four different task types were predicted using trained TSR-ML models based on different data sizes. Graph 800 shows high $R^2$ scores for the TSR-ML models trained for each task type, with all scores being above 0.96, which indicates the validity of the described techniques. $R^2$ scores represent the coefficient of determination of machine learning models, and measures how well observed outcomes are predicted by the models. In the case of graph 800, the $R^2$ scores range from negative infinity to 1, where a score of 1 indicates perfect prediction of outcomes by the model and progressively lower scores indicate progressively more random outcomes by the model.

FIG. 8 further depicts a table 810 that indicates results of predicting dataset sizes in a target encoding. Specifically, the results in table 810 show that a trained DC-ML model with engineered features is correct on average, but underestimates by 6% and overestimates by 7% in the worst cases. The prior art analytical model for predicting dataset sizes on average underestimates by 3% and, in the worst case, by 11%. Further, table 810 shows that the mean square error (MSE) of the trained DC-ML model is an order of magnitude better than the analytical model.

The ratios in table 810 indicate predicted target-encoded data size/real target-encoded data size. The analytical model used insider information about the encoding to compute the data size. The training data for the DC-ML model, used to generate the results reflected in table 810, was based on 9300 data points taken from TPC-H tables with different scale factors. Prediction was done with cross validation for each scale factor, where the DC-ML model was trained on all table data except from one scale factor and predictions were formulated to accommodate the left-out scale factor.

Training Data Generation Framework

According to an embodiment, the training corpus that is used to train the ML models described herein is automatically assembled by a training data generation framework which, e.g., is implemented by ML service 350. Specifically, ML service 350 collects an initial training corpus from available database performance-related data sources such as records of historical database operations and/or established database benchmarks such as TPC-C, TPC-H, etc. According to an embodiment, ML service 350 populates the initial training corpus with features of the workloads that are derivable from the workload data from such data sources, along with any available information about performance metrics for the workloads running on any size of compute node cluster.

One source of training data is historical records of real-world database operations. For example, cloud-based database services provide the opportunity for users to share non-sensitive profiling data from their workloads. Such data may represent a wider variety of workload features, and resulting performance metrics, than other sources of data such as synthetic benchmarking workloads. Some examples of information that may be provided in (or derived from) such historical records include:

Ratios of different types of high-level operations (inserts, updates, queries) among workload operations;
Rates of index updates;
Rates of storage expansion or re-organization;
Rates of buffer cache misses and flushes;
Ratios of database commit operations to total numbers of database operations; and
Sizes of compute node clusters on which the workloads are run.

Building ML models to automatically provision database workloads benefits from a training corpus that covers a wide range of possible values. However, even with good access to data sources recording workload information, the set of training data derived from these sources may not provide information on the full range of performance metrics, database features, and cluster sizes needed for robust ML model training. Thus, according to an embodiment, the training data generation framework formulates, and causes to be run, experiments over known workloads to generate additional training data that is not present in an initial training corpus.

Specifically, a target for the training corpus is to include data resulting from running a variety of workloads on all possible cardinalities of device clusters. For example, users of services provided by network 300 have the option of running compute node clusters of up to 16 compute nodes. In this example, the target for the training corpus is to run all workloads, in a data store of available workloads, on compute node clusters of size 1-16. Specifically, ML service 350 maintains a data store of workloads on which experiments may be run. For example, when ML service 350 receives the request to automatically provision workload 360, ML service 350 automatically adds the received workload to a data store that stores a set of workloads that are available to ML service 350 for training data generation framework-initiated experiments.

Furthermore, to gather all needed information, during experiments, the workload queries are run on the full workload datasets and also on samples of the workload datasets of varying sizes, which allows the ML models to be trained over the correlations between the behavior of workload queries running over dataset samples to the behavior of workloads running over the full datasets.

ML service 350 schedules experiments to fill holes in existing training corpus. ML service 350 schedules experiments over workloads in the data store of available workloads, on resources of network 300, based on information that is not yet in the training corpus. For example, ML service 350 determines that the training corpus does not include information for running a particular workload from the initial training corpus over compute node clusters of sizes 9-16. Accordingly, ML service 350 schedules experiments to run the particular workload over each of the missing compute node cluster sizes.

ML service 350 records features of the workloads, including those mentioned herein, based on the results of the experiments (or the information available for the initial training corpus), including generated query plans, and the intermediate result sizes for the queries in the workload. ML service 350 also gathers performance metrics from the workload experiments, including task runtimes and the network wait times. According to an embodiment, ML service 350 gathers data for the training corpus that includes one or more of the following three categories of features:

1. Features from database profiling information. These features are collected from the profiling data of database systems. Modern database systems provide a wide range of profiling data for tuning and troubleshooting purpose. Those features are a consequence of running a specific workload on certain database configurations. They are a source of information about the interaction between workloads and database systems. For example, MySQL provide global statistics and detailed operation history through performance schema.
2. Features from an underlying infrastructure running the database systems. Such features are collected directly by monitoring various performance related devices (like CPU, memory, I/O devices, network, etc.) in the underlying system. These features depict the behavior of system when workloads are running, and tend to reveal performance-related information like disk swaps, CPU performance, memory bottlenecks, etc.
3. Features derived from the workloads. These are features to characterize different workloads types. For example, the number of insert statements performed in a given workload could be a good differentiator of whether the workload is an analytical or transactional workload.

Training Data Generation Framework: Running an Experiment

According to an embodiment, a particular experiment is automatically run by causing a database management system to manage a particular workload, from the data store of workloads, using the indicated number of compute nodes. According to an embodiment, ML service 350 is communicatively coupled to a scheduling service 370, depicted in FIG. 3 as running on a server device 316. Scheduling service 370 maintains scheduling information that comprises a list of scheduled experiments, formulated by ML service 350. In order to cause a particular experiment to be run, ML service 350 sends information identifying the particular workload and the compute node cardinality for the experiment to scheduling service 370, which adds the experiment information to a list of experiments maintained by the service.

Scheduling service 370 monitors available resources in network 300 and automatically causes experiments from the list to be run on available hardware having the indicated cardinality, as it becomes available. Scheduling service 370 maintains information about which experiments are in progress on what hardware in network 300.

According to an embodiment, scheduling service 370 periodically rebalances the load of experiments being run on available resources in network 300 to most efficiently utilize the available resources and to complete the experiments in as timely a manner as possible. Such rebalancing depends on relative priorities of scheduled and running experiments, such that higher priority experiments get scheduled to be run ahead of other experiments on available machines that are able to efficiently run the experiments. The determination of availability and efficiency of resources is based, at least in part, on current and/or past trends in resource utilization, and also on running time and resource requirements of historical experiments. Because experiments are distributed based on availability and historical information about experimentation, the resources in network 300 maintain balanced loads over time.

In this way, the training data generation framework efficiently utilizes available bandwidth to expand the training corpus. Specifically, because the experiments are tailored to explore data that is missing from the training corpus, the targeted experiments utilize only those resources needed to intelligently expand the training corpus.

Using the Training Corpus to Train Machine Learning Models

ML service 350 trains the ML models described herein over the training corpus gathered using the training data generation framework. According to embodiments, any ML model may be trained using any number of features observed from or engineered from the training corpus notwithstanding any explicit listing herein of particular features on which ML model training is based.

The training corpus based on which ML service 350 trains ML models may contain noisy data that would negatively impact model accuracy if the ML models were trained using the noisy data. According to an embodiment, ML service 350 automatically selects and engineers features, from the data in the training corpus, for ML model training using Auto-Feature-Selection (AutoFS), which is described in detail in the AutoFS Application incorporated by reference above. Using AutoFS, ML service 350 applies feature selection to polish the feature set to remove unnecessary noise from the data. Specifically, AutoFS applies the following operations:

Removes unnecessary features. This will eliminate features having no correlation with the prediction target. For example, features with constant values will be dropped.

Converts categorical features into numerical features. Many raw features collected from database profiling are categorical, for example MySQL configuration parameter "innodb_change_buffering" could have possible values of "none" and "all". Such features may be converted to numerical features by assigning each possible value a unique integer value.

Applies normalization when applicable. Many raw features could have very different value ranges in different workload and system types. For example, MySQL feature "Innodb_data_writes" could have very high values for transactional queries, but relatively low for simple analytical queries.

According to an embodiment, ML service 350 further utilizes the AutoFS framework to automatically apply feature engineering to the training of ML models. Such automatic feature engineering avoids error-prone manual feature selections, and is more efficient than manual efforts given the large number of raw features in the training corpus. Specifically, many simple (non-aggregate) workload features that are recorded in a training corpus do not characterize the nature of the workload by themselves (i.e., in the absence of other workload features). Engineering features for ML model training addresses this problem in that engineered features are generated by combining more than one simple feature. Engineered features may be produced by combining simple or other engineered features in any way, including using addition, subtraction, multiplication, division, concatenation, etc.

For example, for a transactional workload whose number of queries could be different depending on the period of time over which the workload is observed, the simple workload attribute "Byte_received" does not characterize the nature of the workload because the feature is dependent on the number of queries performed in the workload. Thus, this simple feature does not enhance the accuracy of models being trained using this feature by itself. However, an engineered feature that represents a ratio between the two simple workload features "Byte_received" and "Queries" better characterizes the nature of the workload because the engineered feature remains constant without respect to the period of time over which the workload is observed or any configuration parameters being applied to the workload. Because the engineered feature better characterizes the nature of the workload, using this feature in training ML models will result in more accurate predictions from the ML models.

According to an embodiment, different workloads in the training corpus are labeled with type metadata indicating a known workload type. As such, workloads that are labeled as the same type should have consistent features. According to an embodiment, ML service 350 automatically identifies engineered features for workloads of the same type by identifying combinations of simple workload features that are consistent across those workloads that are labeled as the same type.

According to an embodiment, ML service 350 automatically engineers features for ML model training using Auto-Feature-Selection (AutoFS). Specifically, ML service 350 automatically generates a plurality of candidate engineered features for a given ML model, such as a TSR-ML model, by automatically combining workload features. ML service 350 then uses AutoFS to identify one or more of the plurality of candidate engineered features that increase the accuracy of the ML model being trained.

Machine Learning Models

A machine learning model is trained using a particular machine learning algorithm. Once trained, input is applied to the machine learning model to make a prediction, which may also be referred to herein as a predicated output or output. A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process, such as ML service 350, executing a machine learning algorithm applies the model artifact against the input to generate a predicted output. A computer system process executes a machine learning algorithm by executing software configured to cause execution of the algorithm.

Classes of problems that machine learning excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, MatLab, R, and Python.

Feature Synthesis and Engineering

Feature synthesis is the process of transforming raw input into features that may be used as input to a machine learning model. Feature synthesis may also transform other features into input features. Feature engineering refers to the process of identifying features.

A goal of feature engineering is to identify a feature set with higher feature predicative quality for a machine learning algorithm or model. Features with higher predicative quality cause machine learning algorithms and models to yield more accurate predictions. In addition, a feature set with high predicative quality tends to be smaller and require less memory and storage to store. A feature set with higher predicative quality also enables generation of machine learning models that have less complexity and smaller artifacts, thereby reducing training time and execution time when executing a machine learning model. Smaller artifacts also require less memory and/or storage to store.

Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the activation neuron is applied to the weighted input values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W are N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/or serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in a matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., number of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptrons (MLP), including matrix operations and backpropagation, are taught in a related reference "Exact Calculation Of The Hessian Matrix For The Multi-Layer Perceptron," by Christopher M. Bishop, the entire contents of which are hereby incorporated by reference as if fully set forth herein.

Model training may be supervised or unsupervised. For supervised training, the desired (i.e., correct) output is already known for each example in a training set. The training set is configured in advance by (e.g., a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, titled "Auto-Encoder Enhanced Self-Diagnostic Components for Model Monitoring", the entire contents of which is hereby incorporated by reference as if fully set forth herein. That patent application elevates a supervised or unsupervised ANN model as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e., complexity) of a momentary input may be less than the information content of the surrounding context. Thus, semantics may occur based on context, such as a temporal sequence across inputs or an extended pattern (e.g., compound geometry) within an input example. Various techniques have emerged that make deep learning be contextual. One general strategy is contextual encoding, which packs a stimulus input and its context (i.e., surrounding/related details) into a same (e.g., densely) encoded unit that may be applied to an ANN for analysis. One form of contextual encoding is graph embedding, which constructs and prunes (i.e., limits the extent of) a logical graph of (e.g., temporally or semantically) related events or records. The graph embedding may be used as a contextual encoding and input stimulus to an ANN.

Hidden state (i.e., memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection. For example, an RNN based spelling model may predict that a U follows a Q while reading a word letter by letter. If a letter actually following the Q is not a U as expected, then an anomaly is detected.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e., reset) gate. Unlike a binary circuit, the input and output gates may conduct an (e.g., unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e., gross topology). Each step receives two inputs and outputs two outputs. One input is external activation from an item in an input sequence. The other input is an output of the adjacent previous step that may embed details from some or all previous steps, which achieves sequential history (i.e., temporal context). The other output is a predicted next item in the sequence. Example mathematical formulae and techniques for RNNs and LSTM are taught in related U.S. patent application Ser. No. 15/347,501, titled "Memory Cell Unit and Recurrent Neural Network Including Multiple Memory Cell Units", the entire contents of which is hereby incorporated by reference as if fully set forth herein.

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related W.I.P.O. patent application No. PCT/US2017/033698, titled "Memory-Efficient Backpropagation Through Time", the entire contents of which is hereby incorporated by reference as if fully set forth herein.

Random Forest

Random forests or random decision forests are an ensemble of learning approaches that construct a collection of randomly generated nodes and decision trees during the training phase. The different decision trees are constructed to be each randomly restricted to only particular subsets of feature dimensions of the data set. Therefore, the decision trees gain accuracy as the decision trees grow without being forced to over fit the training data as would happen if the decision trees were forced to be restricted to all the feature dimensions of the data set. Predictions for the time-series are calculated based on the mean of the predictions from the different decision trees.

The following is an example and non-limiting method of training a set of Random Forest models for making estimations of network I/O utilization for an example model type, i.e., an AC-ML model, according to an embodiment. A best trained Random Forest ML model is selected, from a set of models resulting from the training phase, to be the basis for instances of a trained ML model. In some embodiments, ML service 350 preprocesses the training corpus data that was gathered from the available data sources prior to (a) labeling the training data that will be used to train the Random Forest ML model or (b) utilizing the training corpus data for unsupervised learning. The preprocessing may include cleaning the readings for null values, normalizing the data, downsampling the features, etc.

In an embodiment, ML service 350 receives hyper-parameter specifications for the Random Forest ML model to be trained. Without limitation, these hyper-parameters may include values of model parameters such as number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

ML service 350 trains the Random Forest ML model using the specified hyper-parameters and the training data set (or the preprocessed training data, if applicable). The trained model is evaluated using the test and validation data sets, as described above.

According to embodiments, a determination is made of whether to generate another set of hyper-parameter specifications. If so, another set of hyper-parameter specifications is generated and ML service 350 trains another Random Forest ML model having the new set of hypermeters specified. All Random Forest ML models trained during this training phase are the set of models from which the best trained ML model is chosen.

Increasing Model Accuracy

The techniques described herein rely on building accurate machine learning models. Thus, according to embodiments, training each of the ML models involves using Auto-Model-Selection (AutoMS), and Auto-Hyperparameter-Tuning (MLAutoTune) to increase the effectiveness of the ML models.

AutoMS-Powered Model Selection

Embodiments improve database performance through automatically tuning a wide range of parameters in various database components. Different database components generally have a very different performance characteristics hidden in different training data features. Different machine learning models provide different ways to model those performance characteristics. As such, flexibility in model selection allows the system to automatically evaluate the effectiveness of various models on prediction accuracy and efficiency for the various different kinds of data being modeled.

For example, deep neural network models have been lately popularly used for various machine learning tasks based on its generality and accuracy. However, experimentation results indicate that RandomForest models sometimes achieve very good accuracy, when compared to some deep neural network models, because this type of model does not require the input features to be normalized.

Thus, according to an embodiment, ML service 350 utilizes an AutoMS framework to automatically pick the best model for the ML models in connection with training the ML models, as described in detail above, which is described in the AutoMS Application incorporated by reference above. The AutoMS framework will help enumerate a large number of machine learning models efficiently, and pick the best model with best prediction accuracy for the given prediction task.

ML Autotune Powered Model Tuning

The accuracy and runtime efficiency of a machine learning model heavily relies on proper setup of hyper-parameters in the model. For embodiments described herein, the issue of proper hyper-parameter selection becomes more impactful because of the very large training corpus and long model training time, and also because of user expectations for fast and accurate results for automatically tuning the configuration parameters of their systems. Manual tuning of model hyper-parameters can be time-consuming and costly because different hyper-parameters are needed for different prediction tasks (for different performance metrics, or different database component parameters), and also manual tuning of hyper-parameters can result in application of less-than-optimal parameter values for the models.

Thus, according to an embodiment, ML service 350 utilizes an MLAutoTune framework to automatically search the best hyper-parameters for model training, which is described in the MLAutoTune Application incorporated by reference above. MLAutoTune efficiently searches through possible hyper-parameter values, and narrows the possible hyper-parameter search space to quickly converge to the best choice. Because of its efficiency, it is possible to run the MLAutoTune framework to apply proper hyper-parameters for the best-pick machine learning model for each individual prediction task, instead of using a fixed set of hyper-parameters for the models as would be required without application of the MLAutoTune framework.

Architecture for Automatically Tuning Configuration Parameters

FIG. 3 is a block diagram that depicts an example network 300, according to one or more embodiments. Server device 314 is configured with ML service 350, server device 316 is configured with a scheduling service 370. ML service 350 or scheduling service 370 may be implemented in any number of ways, including as a stand-alone application running on the server device, web services running on the device, etc. An application, such as a database server of DBMS and embodiments of ML service 350 and scheduling service 370 described herein, runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

Communication between hardware of network 300 may be implemented with any type of medium and/or mechanism that facilitates the exchange of information between computing devices. In an embodiment, each of the techniques described herein are performed automatically and may be implemented using one or more computer programs, other software or hardware elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
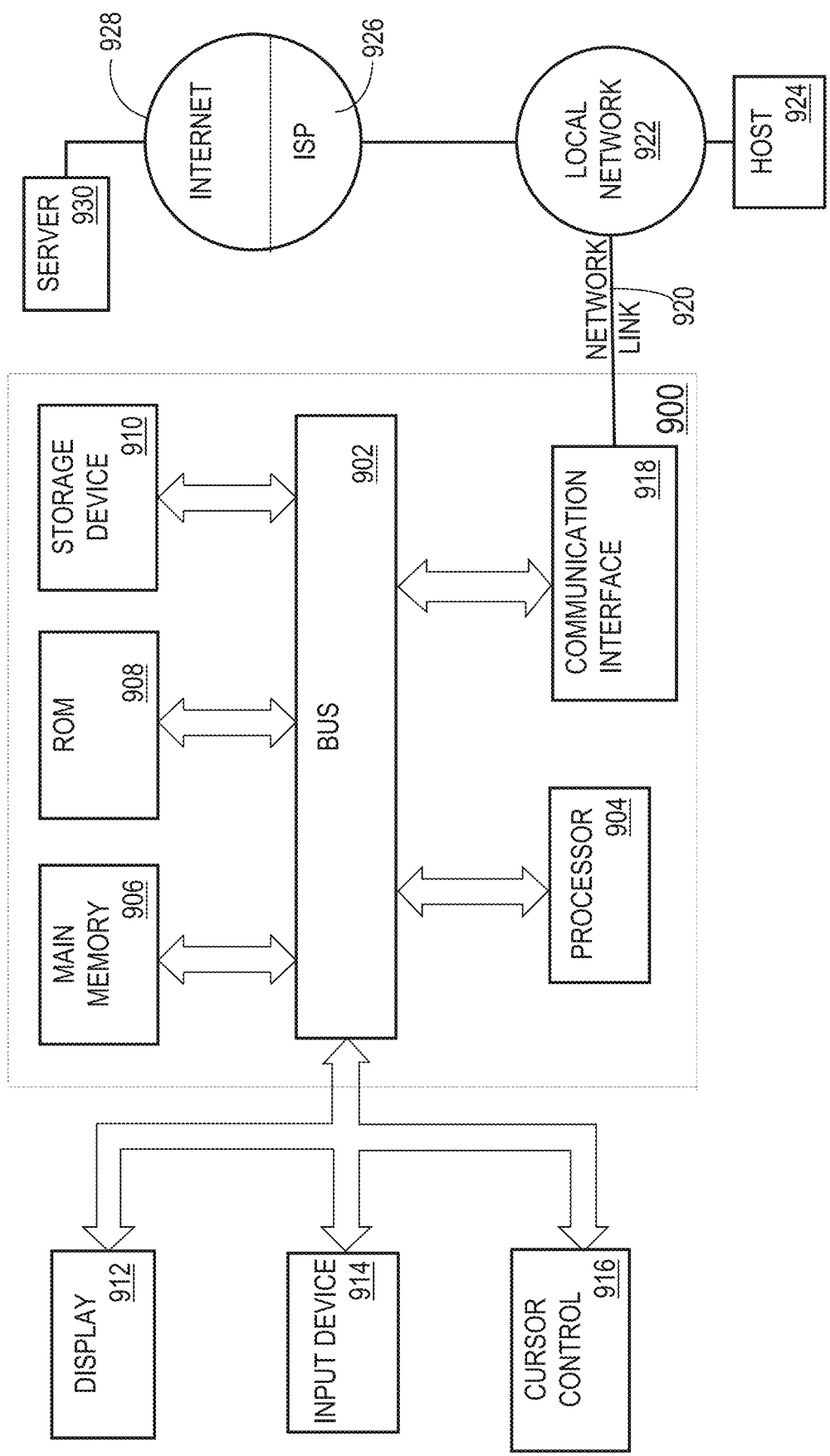
FIG. 9 depicts a computer system that may be used in an embodiment.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Software Overview

Figure 10:
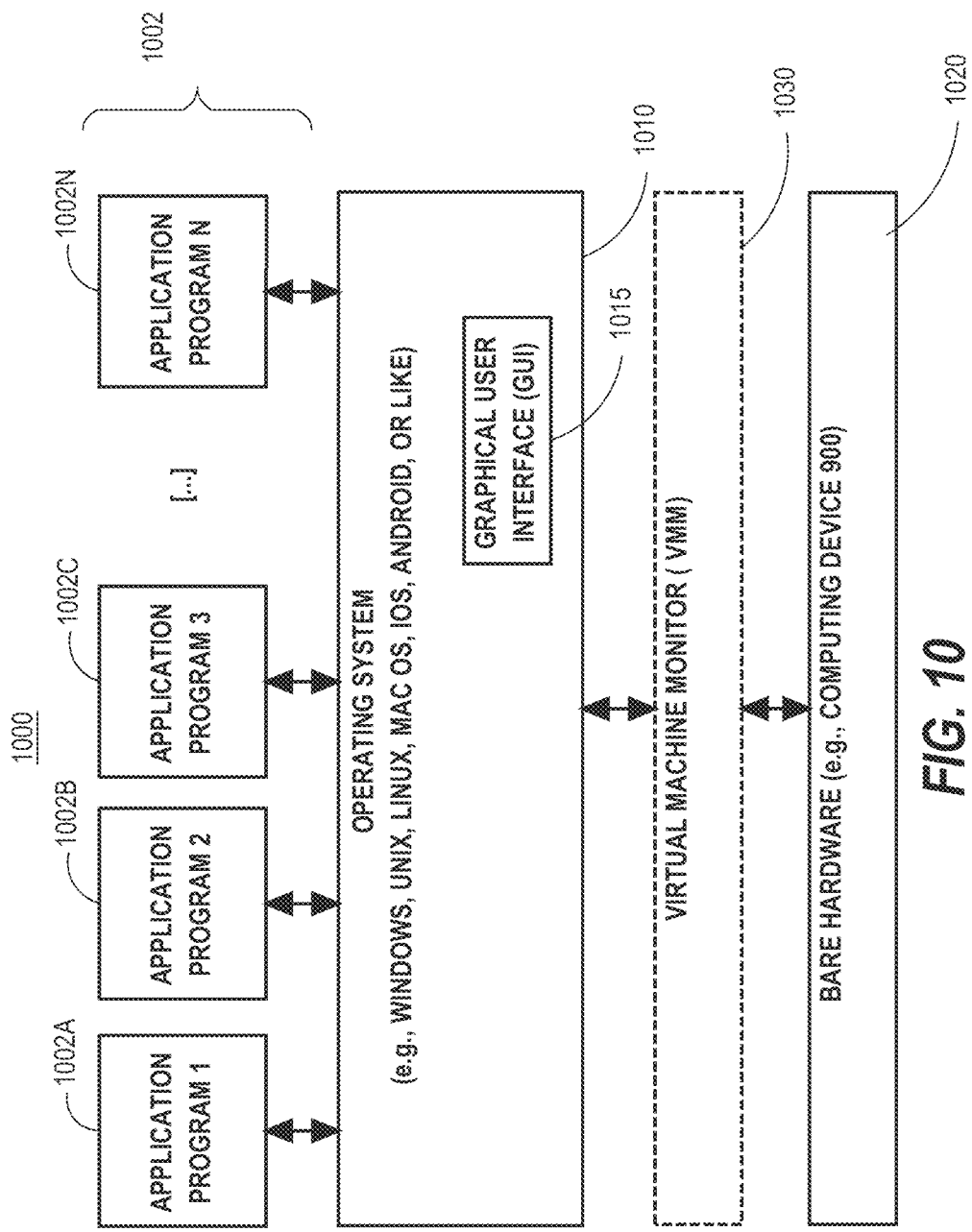
FIG. 10 depicts a software system that may be used in an embodiment.

FIG. 10 is a block diagram of a basic software system 1000 that may be employed for controlling the operation of computer system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computer system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 900 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

What is claimed is:

1. A computer-executed method comprising:
   accessing workload information for a particular database workload, wherein the workload information includes at least (a) a portion of a dataset for the particular database workload and (b) one or more queries being run in the particular database workload;
   for each query of the one or more queries, predicting, based on the workload information and using one or more trained query performance machine learning models, a plurality of predicted query runtimes respectively corresponding to a plurality of different compute node cardinalities;
   based on the plurality of predicted query runtimes identified for each query, of the one or more queries, and on one or more optimization criteria, determining a number of compute nodes for the particular database workload; and
   generating, within a memory, output that specifies the number of compute nodes for the particular database workload;
   wherein the method is performed by one or more computing devices.

2. The method of claim 1, wherein:
   the one or more trained query performance machine learning models comprises a plurality of trained task-specific runtime machine learning models;
   predicting, for a particular query of the one or more queries and based on the workload information and using the one or more trained query performance machine learning models, a particular plurality of predicted query runtimes respectively corresponding to the plurality of different compute node cardinalities comprises:
      predicting, based on the workload information and using the one or more trained query performance machine learning models, a particular query runtime, of the particular plurality of predicted query runtimes, corresponding to a particular compute node cardinality, of the plurality of different compute node cardinalities;
   predicting, based on the workload information and using the one or more trained query performance machine learning models, the particular query runtime, of the particular plurality of predicted query runtimes, corresponding to the particular compute node cardinality, of the plurality of different compute node cardinalities comprises:
      identifying one or more task instances in a query plan for the particular query,
      predicting one or more task instance runtimes, for the one or more task instances, by:
         for each task instance of the one or more task instances, using a trained task-specific runtime machine learning model that is specific to a task type of said each task instance to predict a runtime for said each task instance for the particular compute node cardinality, and
      determining the particular query runtime, for the particular query running on a cluster with the particular compute node cardinality, based at least in part on the one or more predicted task instance runtimes for the one or more task instances.

3. The method of claim 2, wherein:
   the one or more trained query performance machine learning models further comprises one or more trained network communication machine learning models; and
   predicting, based on the workload information and using the one or more trained query performance machine learning models, the particular query runtime, of the particular plurality of predicted query runtimes, corresponding to the particular compute node cardinality, of the plurality of different compute node cardinalities further comprises:
      predicting, based on the particular compute node cardinality and using the one or more trained network communication machine learning models, one or more predicted network communication times for the one or more task instances;
      wherein determining the particular query runtime, for the particular query running on a cluster with the particular compute node cardinality, is further based, at least in part, on the one or more predicted network communication times for the one or more task instances.

4. The method of claim 3, wherein predicting, based on the workload information and using the one or more trained query performance machine learning models, the particular query runtime, of the particular plurality of predicted query runtimes, corresponding to the particular compute node cardinality, of the plurality of different compute node cardinalities further comprises:
  determining one or more instances of runtime/communication overlap;
  wherein each instance of runtime/communication overlap, of the one or more instances of runtime/communication overlap, is between (a) a predicted task instance runtime for a particular task instance, and (b) a predicted network communication time;
  wherein determining the particular query runtime, for the particular query running on a cluster with the particular compute node cardinality, is further based, at least in part, on the one or more instances of runtime/communication overlap.

5. The method of claim 1, further comprising automatically provisioning the determined number of compute nodes to run the particular database workload.

6. The method of claim 1, wherein:
  the one or more queries comprises a plurality of queries; and
  determining the number of compute nodes for the particular database workload comprises:
    determining a plurality of cardinality-specific total workload runtimes by, for each compute node cardinality of the plurality of different compute node cardinalities:
      identifying, for each query of the plurality of queries, a cardinality- specific query runtime for said each query and said each compute node cardinality to produce a plurality of cardinality-specific query runtimes, and
      adding all of the plurality of cardinality-specific query runtimes to produce a cardinality-specific total workload runtime for said each compute node cardinality;
    identifying the number of compute nodes to be a particular compute node cardinality, of the plurality of different compute node cardinalities, that is associated with a minimum cardinality-specific total workload runtime of the plurality of cardinality-specific total workload runtimes.

7. The method of claim 1, wherein:
  the one or more queries comprises a plurality of queries; and
  determining the number of compute nodes for the particular database workload comprises:
    determining a plurality of cardinality-specific workload runtimes by, for each compute node cardinality of the plurality of different compute node cardinalities:
      producing a plurality of cardinality-specific query runtimes by identifying, for each query of the plurality of queries, a cardinality-specific query runtime for said each query and said each compute node cardinality, and
      adding all of the plurality of cardinality-specific query runtimes to produce a cardinality-specific total workload runtime for said each compute node cardinality;
    identifying a maximum cardinality-specific total workload runtime of the plurality of cardinality-specific workload runtimes;
    determining a plurality of cardinality-specific workload speeds by, for each compute node cardinality of the plurality of different compute node cardinalities, determining a cardinality-specific workload speed of said each compute node cardinality to be a ratio of: the maximum cardinality-specific total workload runtime to the cardinality-specific total workload runtime for said each compute node cardinality;
    identifying the number of compute nodes to be a particular compute node cardinality, of the plurality of different compute node cardinalities, that is associated with both:
      a minimum ratio of (a) a cost of the particular compute node cardinality, and (b) a cardinality-specific workload speed associated with the particular compute node cardinality, and
      a fastest cardinality-specific workload speed among those compute node cardinalities, of the plurality of different compute node cardinalities, that are associated with the minimum ratio.

8. The method of claim 1, wherein the one or more optimization criteria comprises one or more of: cost reduction or optimized computation speed.

9. The method of claim 1, wherein the one or more optimization criteria are identified based on a Service-Level-Agreement associated with the particular database workload.

10. The method of claim 1, further comprising:
  determining that one or more performance metrics associated with the particular database workload do not meet one or more performance requirements for the particular database workload;
  wherein said determining the number of compute nodes for the particular database workload is performed responsive to said determining that the one or more performance metrics associated with the particular database workload do not meet the one or more performance requirements for the particular database workload.

11. The method of claim 10, wherein the one or more performance requirements for the particular database workload are indicated in Service-Level-Agreement associated with the particular database workload.

12. One or more non-transitory computer readable media storing instructions that, when executed by one or more processors, cause:
  accessing workload information for a particular database workload, wherein the workload information includes at least (a) a portion of a dataset for the particular database workload and (b) one or more queries being run in the particular database workload;
  for each query of the one or more queries, predicting, based on the workload information and using one or more trained query performance machine learning models, a plurality of predicted query runtimes respectively corresponding to a plurality of different compute node cardinalities;
  based on the plurality of predicted query runtimes identified for each query, of the one or more queries, and on one or more optimization criteria, determining a number of compute nodes for the particular database workload; and
  generating, within a memory, output that specifies the number of compute nodes for the particular database workload.

13. The one or more non-transitory computer readable media of claim 12, wherein:
the one or more trained query performance machine learning models comprises a plurality of trained task-specific runtime machine learning models;
predicting, for a particular query of the one or more queries and based on the workload information and using the one or more trained query performance machine learning models, a particular plurality of predicted query runtimes respectively corresponding to the plurality of different compute node cardinalities comprises:
predicting, based on the workload information and using the one or more trained query performance machine learning models, a particular query runtime, of the particular plurality of predicted query runtimes, corresponding to a particular compute node cardinality, of the plurality of different compute node cardinalities;
predicting, based on the workload information and using the one or more trained query performance machine learning models, the particular query runtime, of the particular plurality of predicted query runtimes, corresponding to the particular compute node cardinality, of the plurality of different compute node cardinalities comprises:
identifying one or more task instances in a query plan for the particular query,
predicting one or more task instance runtimes, for the one or more task instances, by:
for each task instance of the one or more task instances, using a trained task-specific runtime machine learning model that is specific to a task type of said each task instance to predict a runtime for said each task instance for the particular compute node cardinality, and
determining the particular query runtime, for the particular query running on a cluster with the particular compute node cardinality, based at least in part on the one or more predicted task instance runtimes for the one or more task instances.

14. The one or more non-transitory computer readable media of claim 13, wherein:
the one or more trained query performance machine learning models further comprises one or more trained network communication machine learning models; and
predicting, based on the workload information and using the one or more trained query performance machine learning models, the particular query runtime, of the particular plurality of predicted query runtimes, corresponding to the particular compute node cardinality, of the plurality of different compute node cardinalities further comprises:
predicting, based on the particular compute node cardinality and using the one or more trained network communication machine learning models, one or more predicted network communication times for the one or more task instances;
wherein determining the particular query runtime, for the particular query running on a cluster with the particular compute node cardinality, is further based, at least in part, on the one or more predicted network communication times for the one or more task instances.

15. The one or more non-transitory computer readable media of claim 14, wherein predicting, based on the workload information and using the one or more trained query performance machine learning models, the particular query runtime, of the particular plurality of predicted query runtimes, corresponding to the particular compute node cardinality, of the plurality of different compute node cardinalities further comprises:
determining one or more instances of runtime/communication overlap;
wherein each instance of runtime/communication overlap, of the one or more instances of runtime/communication overlap, is between (a) a predicted task instance runtime for a particular task instance, and (b) a predicted network communication time;
wherein determining the particular query runtime, for the particular query running on a cluster with the particular compute node cardinality, is further based, at least in part, on the one or more instances of runtime/communication overlap.

16. The one or more non-transitory computer readable media of claim 12, wherein the instructions further comprise instructions that, when executed by one or more processors, cause automatically provisioning the determined optimal number of compute nodes to run the particular database workload.

17. The one or more non-transitory computer readable media of claim 12, wherein:
the one or more queries comprises a plurality of queries; and
determining the number of compute nodes for the particular database workload comprises:
determining a plurality of cardinality-specific total workload runtimes by, for each compute node cardinality of the plurality of different compute node cardinalities:
identifying, for each query of the plurality of queries, a cardinality-specific query runtime for said each query and said each compute node cardinality to produce a plurality of cardinality-specific query runtimes, and
adding all of the plurality of cardinality-specific query runtimes to produce a cardinality-specific total workload runtime for said each compute node cardinality;
identifying the number of compute nodes to be a particular compute node cardinality, of the plurality of different compute node cardinalities, that is associated with a minimum cardinality-specific total workload runtime of the plurality of cardinality-specific total workload runtimes.

18. The one or more non-transitory computer readable media of claim 12, wherein:
the one or more queries comprises a plurality of queries; and
determining the number of compute nodes for the particular database workload comprises:
determining a plurality of cardinality-specific workload runtimes by, for each compute node cardinality of the plurality of different compute node cardinalities:
producing a plurality of cardinality-specific query runtimes by identifying, for each query of the plurality of queries, a cardinality-specific query runtime for said each query and said each compute node cardinality, and
adding all of the plurality of cardinality-specific query runtimes to produce a cardinality-specific total workload runtime for said each compute node cardinality;

identifying a maximum cardinality-specific total workload runtime of the plurality of cardinality-specific workload runtimes;

determining a plurality of cardinality-specific workload speeds by, for each compute node cardinality of the plurality of different compute node cardinalities, determining a cardinality-specific workload speed of said each compute node cardinality to be a ratio of: the maximum cardinality-specific total workload runtime to the cardinality-specific total workload runtime for said each compute node cardinality;

identifying the number of compute nodes to be a particular compute node cardinality, of the plurality of different compute node cardinalities, that is associated with both:
- a minimum ratio of (a) a cost of the particular compute node cardinality, and (b) a cardinality-specific workload speed associated with the particular compute node cardinality, and
- a fastest cardinality-specific workload speed among those compute node cardinalities, of the plurality of different compute node cardinalities, that are associated with the minimum ratio.

19. The one or more non-transitory computer readable media of claim 12, wherein the one or more optimization criteria comprises one or more of: cost reduction or optimized computation speed.

20. The one or more non-transitory computer readable media of claim 12, wherein the one or more optimization criteria are identified based on a Service-Level-Agreement associated with the particular database workload.

21. The one or more non-transitory computer readable media of claim 12, wherein the instructions further comprise instructions that, when executed by one or more processors, cause:

determining that one or more performance metrics associated with the particular database workload do not meet one or more performance requirements for the particular database workload;

wherein said determining the number of compute nodes for the particular database workload is performed responsive to said determining that the one or more performance metrics associated with the particular database workload do not meet the one or more performance requirements for the particular database workload.

22. The one or more non-transitory computer readable media of claim 21, wherein the one or more performance requirements for the particular database workload are indicated in Service-Level-Agreement associated with the particular database workload.

* * * * *

UNITED STATES PATENT AND TRADEMARK OFFICE
CERTIFICATE OF CORRECTION

PATENT NO. : 11,256,698 B2
APPLICATION NO. : 16/382085
DATED : February 22, 2022
INVENTOR(S) : Idicula et al.

It is certified that error appears in the above-identified patent and that said Letters Patent is hereby corrected as shown below:

On the Title Page

On page 2, Column 1, under Other Publications, Line 5, delete "Microsodt" and insert -- Microsoft --, therefor.

On page 2, Column 2, under Other Publications, Line 27, delete "Machinelearning," and insert -- Machine learning, --, therefor.

On page 3, Column 1, under Other Publications, Lines 21-22, delete "Seletion" and insert -- Selection --, therefor.

On page 3, Column 2, under Other Publications, Line 1, delete "Algotithm" and insert -- Algorithm --, therefor.

In the Claims

In Column 38, Line 21, in Claim 16, delete "determined optimal" and insert -- determined --, therefor.

Signed and Sealed this
Sixth Day of September, 2022

Katherine Kelly Vidal
*Director of the United States Patent and Trademark Office*